United States Patent
Samejima et al.

(10) Patent No.: US 7,012,381 B2
(45) Date of Patent: Mar. 14, 2006

(54) DC—DC CONVERTER AND DEVICE FOR OPERATION OF A HIGH PRESSURE DISCHARGE LAMP USING THE CONVERTER

(75) Inventors: Takanori Samejima, Himejis (JP); Masashi Okamoto, Akashi (JP); Yoshikazu Suzuki, Yokohama (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 46 days.

(21) Appl. No.: 10/887,346

(22) Filed: Jul. 9, 2004

(65) Prior Publication Data

US 2005/0007036 A1     Jan. 13, 2005

(30) Foreign Application Priority Data

Jul. 9, 2003    (JP)    ............................. 2003-194356

(51) Int. Cl.
 *H05B 37/02*    (2006.01)
(52) U.S. Cl. .................. 315/219; 315/224; 315/276; 363/21.02
(58) Field of Classification Search .................. None
 See application file for complete search history.

(56) References Cited

U.S. PATENT DOCUMENTS 5,173,643 A * 12/1992 Sullivan et al. ............. 315/276
5,416,387 A * 5/1995 Cuk et al. ................ 315/209 R
5,880,940 A   3/1999 Poon

FOREIGN PATENT DOCUMENTS

| JP | 01-218352   | 8/1989 |
| JP | 2001-037214 | 2/2001 |

* cited by examiner

*Primary Examiner*—David Vu
(74) *Attorney, Agent, or Firm*—Nixon Peabody LLP; David S. Safran

(57) ABSTRACT

A low cost DC-DC converter facilitates a reduction of the switching loss in the wide, variable range of the continuity ratio for a main switching device. The DC-DC converter includes a direct current source, an ON-OFF-controllable main switching device, a main coil which is series connected to the main switching device, a fly-wheel diode which is arranged such that the induction current of the main coil flows when the main switching device is shifted into the OFF state, and a smoothing capacitor for smoothing the output of the main coil, Also included is an auxiliary transformer with a primary winding as a direct current source and a secondary winding. The main switching device and the auxiliary switching device are controlled such that they are shifted alternatively into the ON state, and the main switching device, is shifted into the ON state a given time after the auxiliary switching device has been shifted into the OFF state.

6 Claims, 19 Drawing Sheets

DC—DC CONVERTER AND DEVICE FOR OPERATION OF A HIGH PRESSURE DISCHARGE LAMP USING THE CONVERTER

BACKGROUND OF THE INVENTION

1. Field of the Invention

The invention relates to a DC-DC converter of the voltage reduction-buck type with the PWM (pulse width modulation) method in which the efficiency is increased, and a device for operating a high pressure discharge lamp such as a metal halide lamp, mercury lamp or the like, using a DC-DC converter.

2. Description of the Related Art

Conventionally, of the converters which convert the voltage of a DC source into another value, output it and supply it to a load, i.e. DC-DC converters, the DC-DC converter of the voltage reduction-buck type, which is shown in FIG. 18 is often used to carry out voltage reduction-conversion.

In this circuit, the current from the DC source (Vin) is repeatedly shifted by a main switching device (Qx') such as a FET or the like into the ON state or the OFF state, and a smoothing capacitor (Cx') is charged via the main coil (Lx'). In this arrangement this voltage can be applied to a load (Zx).

During the interval in which the above described main switching device (Qx') is in the ON state, charging of the smoothing capacitor (Cx') and current supply to the load (Zx) are carried out directly by the current through the main switching device (Qx'), and moreover, in the main coil (Lx'), energy is stored in the form of a flux. During the interval in which the main switching device (Qx') is in the OFF state, the smoothing capacitor (Cx') is charged via a fly-wheel diode (Dx') by the energy stored in the form of a flux in the main coil (Lx') and current is supplied to the load (Zx).

This converter is operated under PWM control of the main switching device (Qx'). Specifically, by feedback control of the ratio between the time interval in the ON state and the sum of the period of the ON state and the period of the OFF state of the main switching device (Qx'), i.e., the continuity ratio, the voltage supplied to the load (Zx) can be adjusted, even as the voltage of the DC source (Vin) fluctuates, to a desired (for example, constant) value, the supplied current can be adjusted to a desired value and the supplied wattage can be adjusted to the desired value.

Of course, the value of the desired efficiency (voltage, current, wattage or the like) can assume a constant value or it can also be changed over time. For feedback control of the desired efficiency, a detector is needed to determine the output voltage and the output current, as is a feedback control circuit, which is not shown in the drawings.

FIG. 19 shows the voltage and current waveform of this converter using one example. If the main switching device (Qx') is shifted into the ON state, the voltage (VxD') supplied to the main switching device (Qx') passes from the voltage of the DC source (Vin) essentially to 0 V. However, this transition does not take place instantaneously, but requires a certain time.

Here, in the process in which the voltage (VxD') of the main switching device (Qx') gradually decreases, the current (IQx') of the main switching device (Qx') also gradually begins to flow. Therefore, there is an interval during which neither the voltage (VxD') nor the current (IQx') is 0. According to the size of the time integral of the product of the voltage and the current, for each transition of the main switching device (Qx') into the ON state a switching loss (SwL) occurs on the main switching device (Qx').

This switching loss also arises by the same process in the case of the transition into the ON state as in a transition into the OFF state. However, normally the loss in the transition into the ON state is greater. The reason is that when the main switching device (Qx') is a FET, for example, a parasitic electrostatic capacitance is present between the source electrode and the drain, that the electrical charge which has been charged onto this electrostatic capacitance during the interval of the OFF state of the main switching device (Qx') at the voltage of the DC source (Vin), in the transition into the ON state is subjected to forced short circuit discharge, and that the energy which is consumed in doing so is added to the switching loss (SwL).

When this switching loss is present, there is not only the disadvantage of a reduction in the efficiency of the converter, but also the disadvantage of a large converter and a cost increase of it, since the heat generation of the main switching device (Qx') is large and since therefore a switching device with large maximum power dissipation must be used and furthermore there must be a large radiator with high radiation efficiency in addition. Furthermore, the fan that supplies cooling air for cooling the radiator must be a high capacity fan, which brings the disadvantages of the reduction in the efficiency and the increase in size and cost of the converter.

In order to eliminate these disadvantages, conventionally, a host of proposals have been made. They are mainly technologies that prevent intervals during which neither the voltage (VxD') nor the current (IQx') is 0. Normally, the technology in which switching is carried out at a 0 voltage of the switching device, is called zero voltage switching, and the technology in which switching is carried out at a 0 current of the switching device, is called zero current switching. Often, using a so-called LC resonance the voltage applied to the switching device and the current flowing in the switching device are temporarily taken over by the voltage induced by the L component (coil) and the current flowing in the C component (capacitor) and are essentially set or reduced to 0, and during this time, a transition of the switching device into the ON state or the OFF state is carried out.

For example, in Japanese patent document HEI 1-218352, a DC-DC converter of the voltage reduction-buck type with current resonance is proposed. In this proposal the current flowing in the main switching device (Qx'), however, due to resonance has a higher peak value than a conventional DC-DC converter of the voltage reduction-buck type. Therefore, it becomes necessary to use a switching device with a high current. Furthermore, in the case in which the switching frequency is higher than the resonant frequency, it is possible that the loss continues to increase because the switching device is shifted into the OFF state at a high current.

Furthermore, in this circuit arrangement, according to the assumption of a constant output voltage for a DC-DC converter, the PWM method is undertaken with a constant switching frequency. Because of this, it is necessary to match the continuity ratio thereof to the resonant frequency. Therefore, the range of the continuity ratio is limited. An increase of the efficiency can therefore only be accomplished in the vicinity of the rated output voltage. Neither a guideline nor conditions for a measure against the fluctuation of the load were considered.

Also, for example, U.S. Pat. No. 5,880,940 discloses a DC-DC converter of the voltage reduction-buck type in which a secondary winding is added to the main coil (Lx')

and thus a transformer is formed. In this proposal, a DC-DC converter is described as being operated by connecting an auxiliary switching device to the transformer as a forward converter. However, an increase of the ripple in the output current by this operation was not even considered. The added auxiliary switching device cannot be subjected to zero voltage switching either. It is necessary to add another coil and to carry out zero current switching.

In the case of zero current switching, differently than in zero voltage switching, there is specifically the disadvantage that the problem of power consumption loss as a result of the forced short circuit discharge is not eliminated in the transition of the electrical charge into an ON state which was charged in the parasitic electrostatic capacitance of the main switching device. Therefore, this is not ideal.

Furthermore, for example, Japanese patent document JP 2001-37214 discloses a DC-DC converter of the voltage reduction-buck type in which a resonant coil, a resonant capacitor and an auxiliary switching device were added. In this proposal, in the case in which the auxiliary switching device is, for example, a FET, for a gate drive an insulating gate driver means, such as a pulse transformer, a photocoupler, a high-side-driver, or the like, is necessary. Originally, likewise, an insulating gate driver means is also necessary for the gate drive of the main switching device. Since an insulating gate driver means has relatively high costs, the requirement for an insulating gate driver means for driving the auxiliary switching device is disadvantageous due to the increase in the number of parts, the further complication of the circuit arrangement, and thus, the difficulty in cost reduction.

If, on the other hand, the use of a DC-DC converter of the voltage reduction-buck type is considered, the resonant conditions of the LC resonance circuit are easily satisfied in a stable manner, since the output voltage is relatively stable for applications such as a constant voltage current source or the like.

However, in the case of use as a device for operating a high pressure discharge lamp, such as a metal halide lamp, a mercury lamp or the like, the lamp voltage as the output voltage is changed significantly by the state of the lamp as a load. Under certain circumstances, it fluctuates steeply. Therefore, a specially adapted construction is needed. The converter must also be matched to this construction.

The feature of the high pressure discharge lamp as the load of the converter is described below. Generally a high pressure discharge lamp (Ld) has an arrangement in which a discharge space (Sd) is filled with a discharge medium which contains mercury and in which a pair of opposed electrodes (E1, E2) is located for producing the main discharge. Between the electrodes (E1, E2), an arc discharge is produced and the radiation emitted from the arc plasmas is used as the light source.

The high pressure discharge lamp (Ld), differently than a general load, exhibits a property which is closer to a Zener diode than to an impedance element. This means that the lamp voltage does not change greatly, even if the flowing current changes. However, a lamp voltage which corresponds to a Zener voltage changes greatly depending on the discharge state.

Specifically, in the state before the start of the discharge, the Zener voltage is extremely high because no current at all is flowing. If by operating a starter, such as a high voltage pulse generator or the like, a discharge is started, a glow discharge is formed. In the case, for example, of a discharge lamp which contains at least 0.15 mg of mercury per cubic millimeter of volume of the discharge space (Sd), the glow discharge voltage ranges from 180 V to 250 V. In the state before the start of the discharge, a voltage of at least equal to the glow discharge voltage is applied to the high pressure discharge lamp. Normally, this voltage is roughly 270 V to 350 V and is called the no-load voltage. The starter is operated in this way.

When the electrodes (E1, E2) are heated by the glow discharge to a sufficient degree, a sudden transition into an arc discharge takes place. Immediately after the transition a low arc discharge voltage from 8 V to 15 V is shown. This is a transient arc discharge. The arc discharge vaporizes the mercury, and if heating of the mercury vapor continues, the arc discharge voltage gradually increases until it reaches a steady-state arc discharge from 50 V to 150 V. The voltage in a steady-state arc discharge, i.e., the lamp voltage, depends on the density of the mercury which has been added to the discharge space (Sd) and the distance between the electrodes (E1, E2). Immediately after the transition into the arc discharge, depending on the vapor state of the mercury, the glow discharge suddenly returns or the arc discharge and the glow discharge takes place alternately in a vigorous back and forth manner.

At a constant voltage from the DC source (Vin), the output voltage of the DC-DC converter of the voltage reduction-buck type is at a value which is obtained by multiplying roughly the voltage of the DC source (Vin) by the continuity ratio. Therefore, the DC-DC converter of the voltage reduction-buck type can be kept approximately for the DC-constant voltage current source.

On the other hand, in idealized switching theory, in the case in which a DC-constant voltage current source is connected to a Zener diode as a load, i.e., still another DC-constant voltage current source, the theory fails and good analysis is not possible. More accurately, when in the case of connecting a Zener diode as the load to a constant voltage current source, the output voltage of the constant voltage current source is lower than the Zener voltage, no current at all flows in the Zener diode. Conversely, in the case in which the output voltage of the constant voltage current source is higher than the Zener voltage, an infinitely large current flows.

In the case in which a discharge lamp which can be roughly regarded as a Zener diode is connected to a realistically present DC-DC converter of the voltage reduction-buck type as a load, extinction of the discharge occurs in the case in which the output voltage of the converter is lower than the Zener voltage. Conversely, in the case in which the output voltage of the converter is higher than the Zener voltage, an unduly high current which is determined by the current serviceability of the DC source (Vin) and of the converter flows in the lamp.

Therefore, in a device for operating a high pressure discharge lamp, the following is required of a converter for supplying a high pressure discharge lamp:

There is a demand for the property which enables a prompt change of the continuity ratio in a wide, variable range for PWM control according to the discharge voltage of the high pressure discharge lamp in order to prevent extinction of the discharge from occurring or an unduly large current from flowing and the lamp and converter circuit from being damaged. These must be achieved even at a discharge voltage that corresponds to the no-load voltage which changes, in this way, to a great extent and also vigorously depends on the discharge state, i.e., the state in which a no-load voltage is applied (state before the start of discharge), the glow discharge state, the state of a transient arc discharge, or the steady-state arc discharge state. Furthermore, there is a demand for a property that enables maintenance of operation in which the switching loss is reduced by resonant operation.

In the case of high ripple which is contained in the current flowing in the discharge lamp, there is a case in which instability, flicker and extinction of the discharge arise due to acoustic resonance. Therefore, it is required of the converter that the ripple of the output current is small. As a result, it is necessary to prevent the operation of the resonant circuit which is arranged for reducing switching loss from accelerating the formation of a superfluous ripple component.

In the case, for example, of a DC-DC converter of the voltage reduction-buck type which is described in the above cited U.S. Pat. No. 5,880,940, the main coil also acts as a transformer with a resonant oscillation effect. Originally during the interval in which the main switching device is in the ON state, in base operation of the DC-DC converter of the voltage reduction-buck type on its two ends the main coil has a difference voltage between the supplied DC source voltage and the output voltage and works in such a way that the input DC source voltage is not applied directly to the load.

In the case of a great fluctuation of the output voltage, of course, the voltage on the primary side of the transformer fluctuates greatly with a resonant oscillation effect. Since the energy transmitted to the secondary circuit of the transformer also fluctuates greatly because of the resonant oscillation effect, as a result the resonant operation also fluctuates greatly. The DC-DC converter of the voltage reduction-buck type described in U.S. Pat. No. 5,880,940 is therefore not suited as a converter for supplying a high pressure discharge lamp.

As was mentioned above, it is necessary in a DC-DC converter of the voltage reduction-buck type to reduce the switching loss in order to avoid raising the size and costs of the converter. However, in the prior art, it was difficult to have a wide, variable range of output voltage and to keep down the cost because of the addition of the resonant circuit. In particular, it was difficult to obtain a converter that is suited to operate a high pressure discharge lamp.

SUMMARY OF THE INVENTION

A primary object of the present invention is to devise a low cost DC-DC converter that eliminates the disadvantage of a conventional DC-DC converter, i.e., the disadvantage of difficult implementation of a reduction of the switching loss in a wide, variable range of the continuity ratio of the main switching device.

Another object of the invention is to devise a device for operating a high pressure discharge lamp that eliminates the disadvantage of a conventional device for operating a high pressure discharge lamp, i.e., the disadvantage of difficult implementation of a reduction of the switching loss with low costs.

According to the first aspect of the invention for a DC-DC converter of the voltage reduction-buck type which includes the following:

a direct current source (Vin);

an ON-OFF-controllable main switching device (Qx);

a main coil (Lx) which is series connected to the main switching device (Qx);

a fly-wheel diode (Dx) which is arranged such that the induction current of the main coil (Lx) flows when the main switching device (Qx) is shifted into the OFF state; and a smoothing capacitor (Cx) for smoothing the output of the main coil (Lx), the object is achieved in that, furthermore, there is an auxiliary transformer (Tw) with a primary winding (Pw) and a secondary winding (Sw), that the primary winding (Pw), the direct current source (Vin), the main switching device (Qx) and the fly-wheel diode (Dx) are connected in series, that the secondary winding (Sw), a resonant capacitor (Cw) and an ON-OFF-controllable auxiliary switching device (Qw) form a series-connected closed loop, and that the main switching device (Qx) and the auxiliary switching device (Qw) are controlled such that they are shifted in alternation into the ON state. Moreover, the main switching device (Qx), after the auxiliary switching device (Qw) has been shifted into the OFF state, is shifted into the ON state within a given time τzz.

According to one development of the above described DC-DC converter, the above objects are achieved in that in the closed loop in which the secondary winding (Sw) of the auxiliary transformer (Tw), the auxiliary switching device (Qw) and the resonant capacitor (Cw) are series connected, one end of the auxiliary switching device (Qw) is connected to the ground line of the direct current source (Vin).

According to another aspect of the invention, in a DC-DC converter of the voltage reduction-buck type which includes:

a direct current source (Vin);

an ON-OFF-controllable main switching device (Qx);

a main coil (Lx) which is series connected to the main switching device (Qx);

a fly-wheel diode (Dx) which is arranged such that the induction current of the main coil (Lx) flows when the main switching device (Qx) is shifted into the OFF state; and a smoothing capacitor (Cx) for smoothing the output of the main coil (Lx), the object is achieved in that there is an auxiliary transformer (Tw) with a primary winding (Pw) and a secondary winding (Sw), that the primary winding (Pw), the direct current source (Vin), the main switching device (Qx) and the fly-wheel diode (Dx) are connected in series, that a series connection in which the secondary winding (Sw), a resonant capacitor (Cw) and an ON-OFF-controllable auxiliary switching device (Qw) are connected in series is connected between the ground line of the direct current source (Vin) and the nodal point between the fly-wheel diode (Dx) and the main coil (Lx), and that the main switching device (Qx) and the auxiliary switching device (Qw) are controlled such that they are shifted in alternation into the ON state, and moreover, the main switching device (Qx), after the auxiliary switching device (Qw) has been shifted into the OFF state, is shifted into the ON state within a given time τzz.

Furthermore, in a device for operating a high pressure discharge lamp (Ld) in which the discharge space (Sd) is filled with a discharge medium and there is a pair of opposed electrodes (E1, E2) for the main discharge, the object is achieved in that the DC-DC converter for supplying the high pressure discharge lamp (Ld) is the above described DC-DC converter.

Advantages

First of all, the action of the invention is described in its first aspect.

In this invention, by the arrangement of the DC-DC converter which is described in achieving the object, the auxiliary switching device (Qw) is shifted into the OFF state before the main switching device (Qx) is shifted into the ON state, furthermore in the primary winding (Pw) a voltage is induced in the direction in which the main switching device (Qx) is biased in the backward direction, and the electrical charge of the parasitic electrostatic capacitance of the main switching device (Qx) is discharged via a fly-wheel diode (Dx). In this way, the invention acts such that zero voltage switching is obtained when the main switching device (Qx) is shifted into the ON state. Details are given below.

Furthermore, as is described below, because control is exercised such that the auxiliary switching device (Qw) is shifted into the ON state within a given time τxx of the invention after the main switching device (Qx) has been shifted into the OFF state, the following can be achieved.

Before the auxiliary switching device (Qw) is shifted into the ON state, the main switching device (Qx) is shifted into the OFF state, in the secondary winding (Sw) the voltage is induced in the direction in which the auxiliary switching device (Qw) is biased in the backward direction and the electrical charge of the parasitic electrostatic capacitance of the auxiliary switching device (Qw) is discharged. In this way zero voltage switching can be obtained when the auxiliary switching device (Qw) is shifted into the ON state.

The invention is further described below using several embodiments which are shown in the drawings.

DETAILED DESCRIPTION OF THE INVENTION

Figure 1:
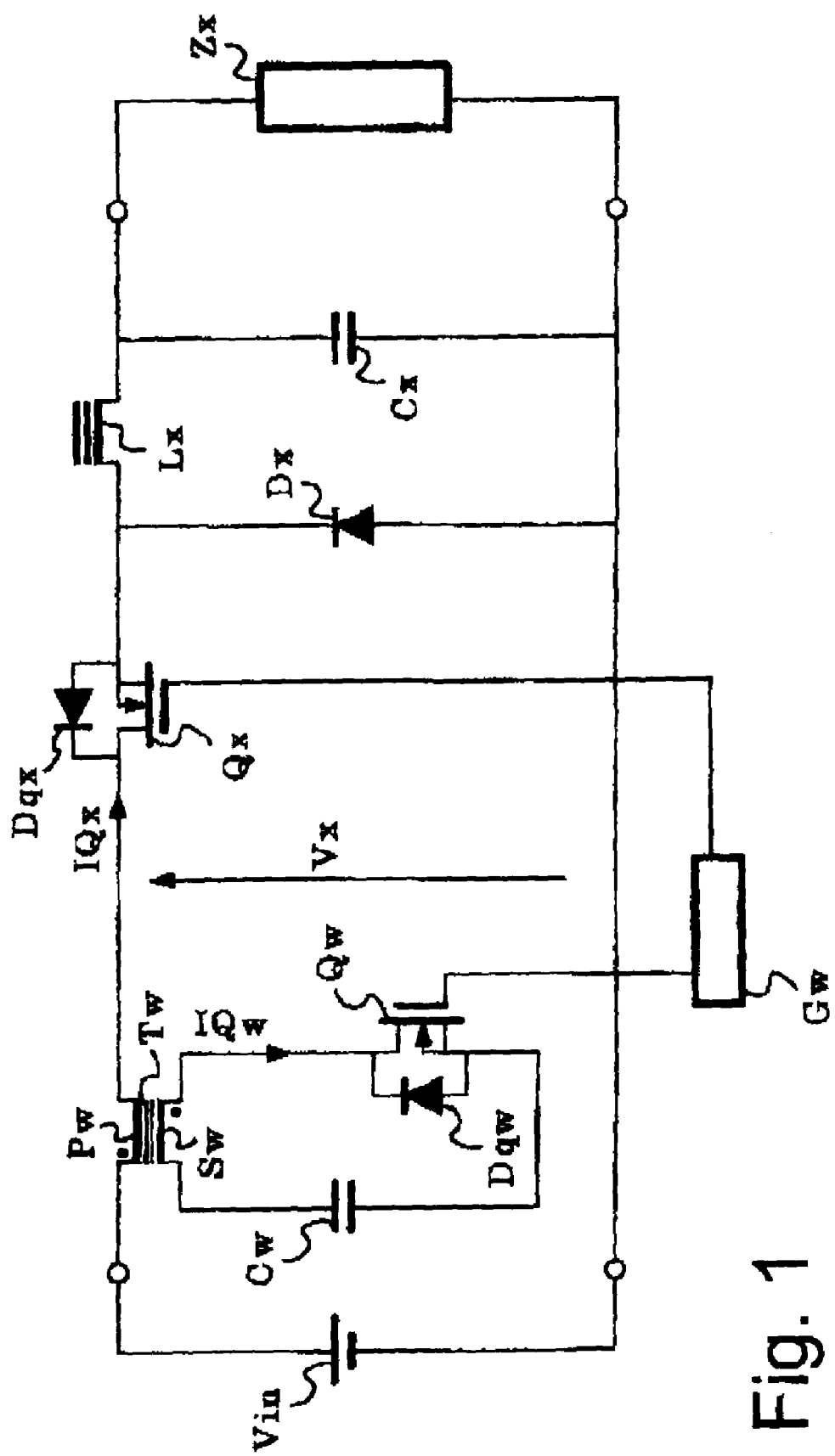
FIG. 1 shows a schematic of the circuit arrangement of a DC-DC converter of the invention.
Figure 2:
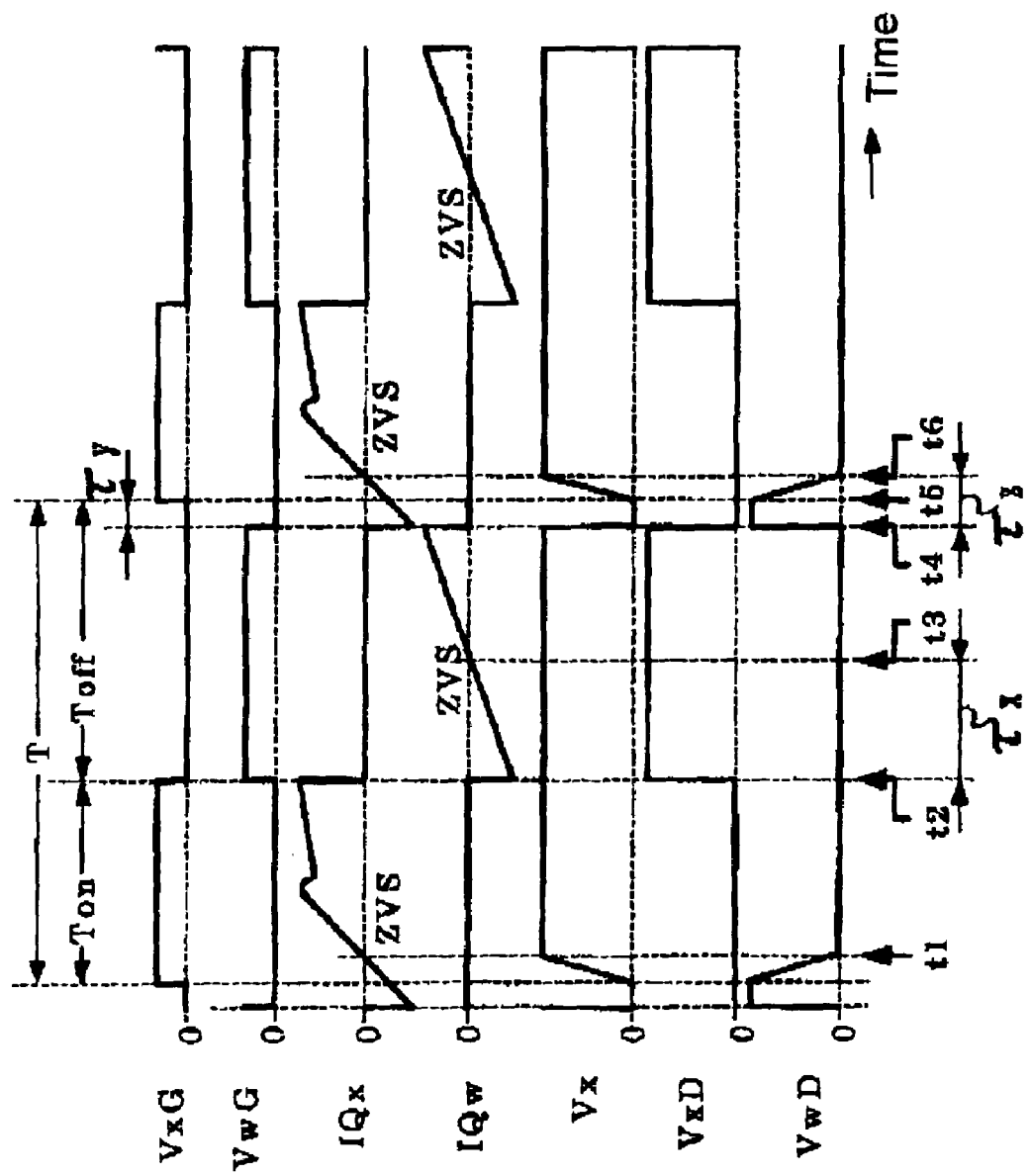
FIG. 2 shows a schematic of the voltages and of the current waveforms which correspond to the circuit arrangement of the DC-DC converter according to the first aspect of the invention.
Figure 17:
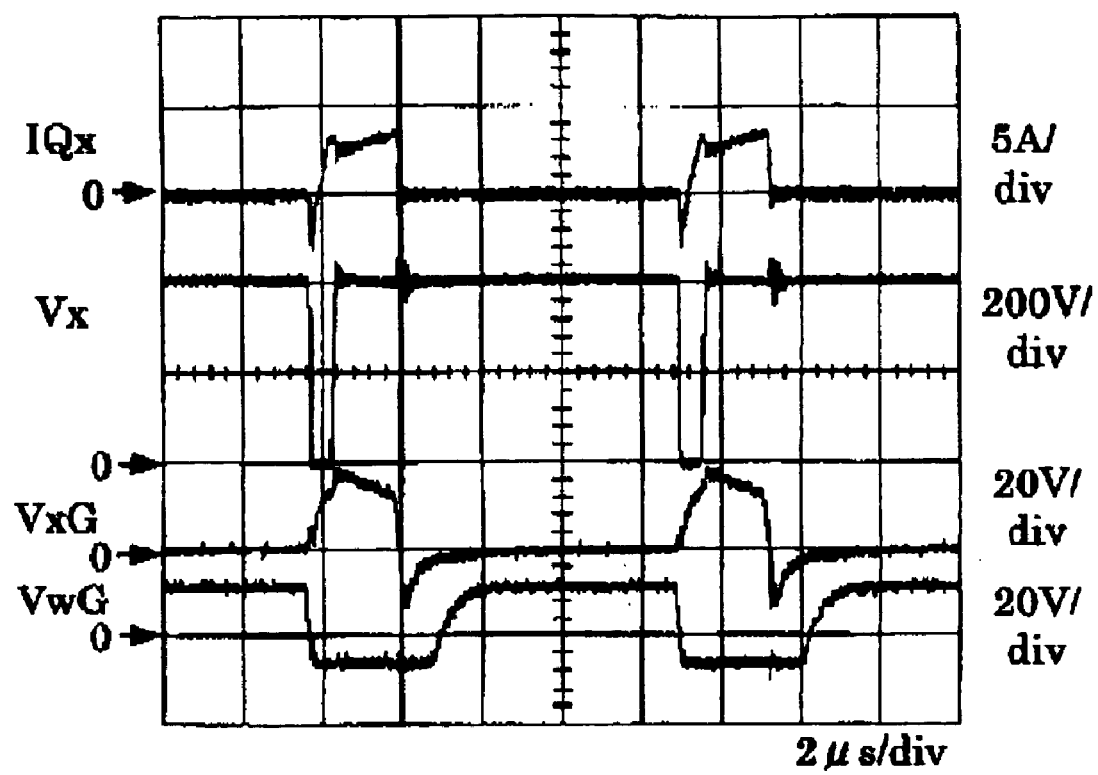
FIG. 17 shows a schematic of the voltages measured in reality and of the current waveforms of the DC-DC converter according to a second aspect of the invention.
Figure 18:
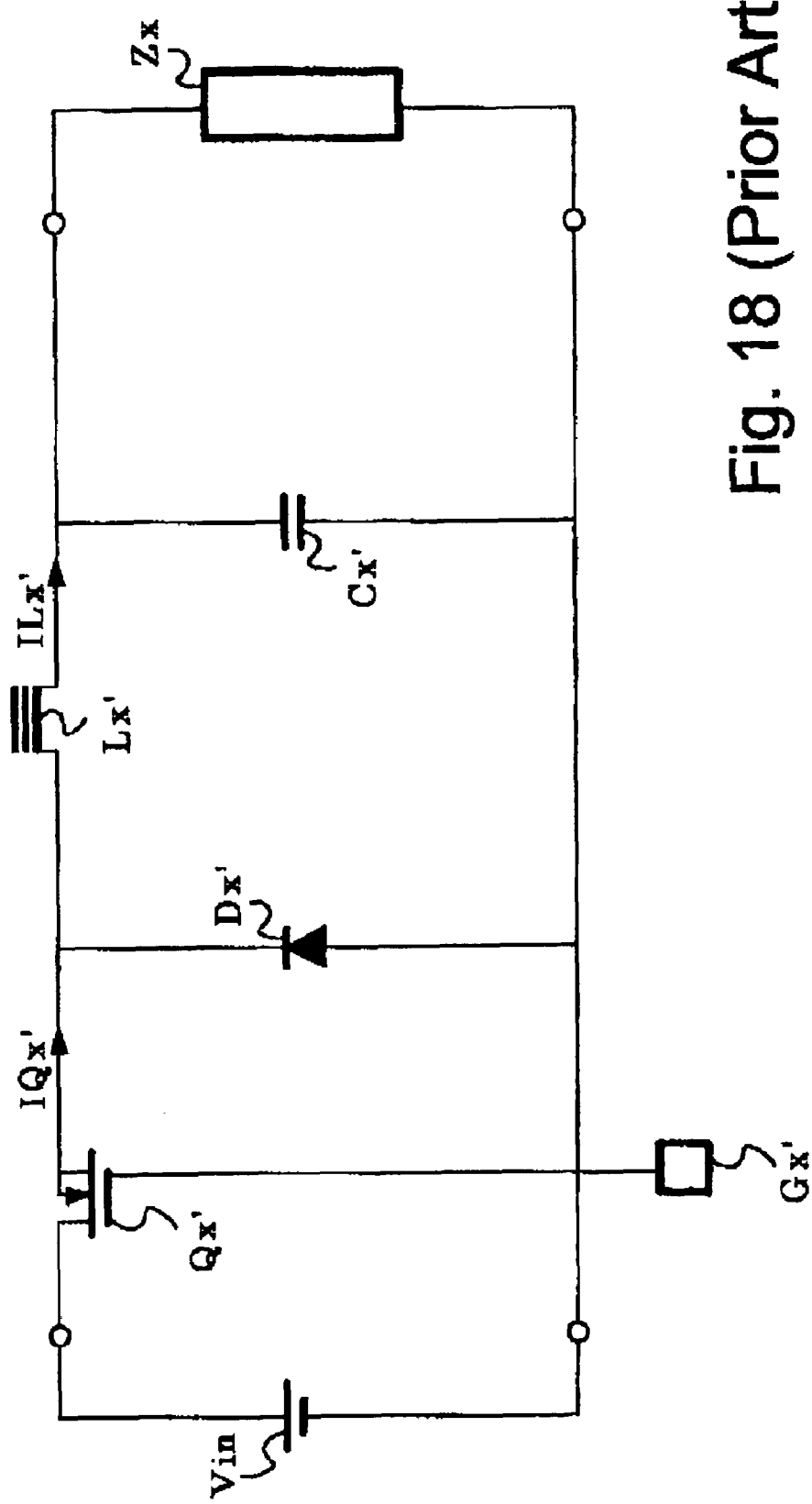
FIG. 18 shows a schematic of the circuit arrangement of a conventional DC-DC converter of the voltage reduction-buck type.
Figure 19:
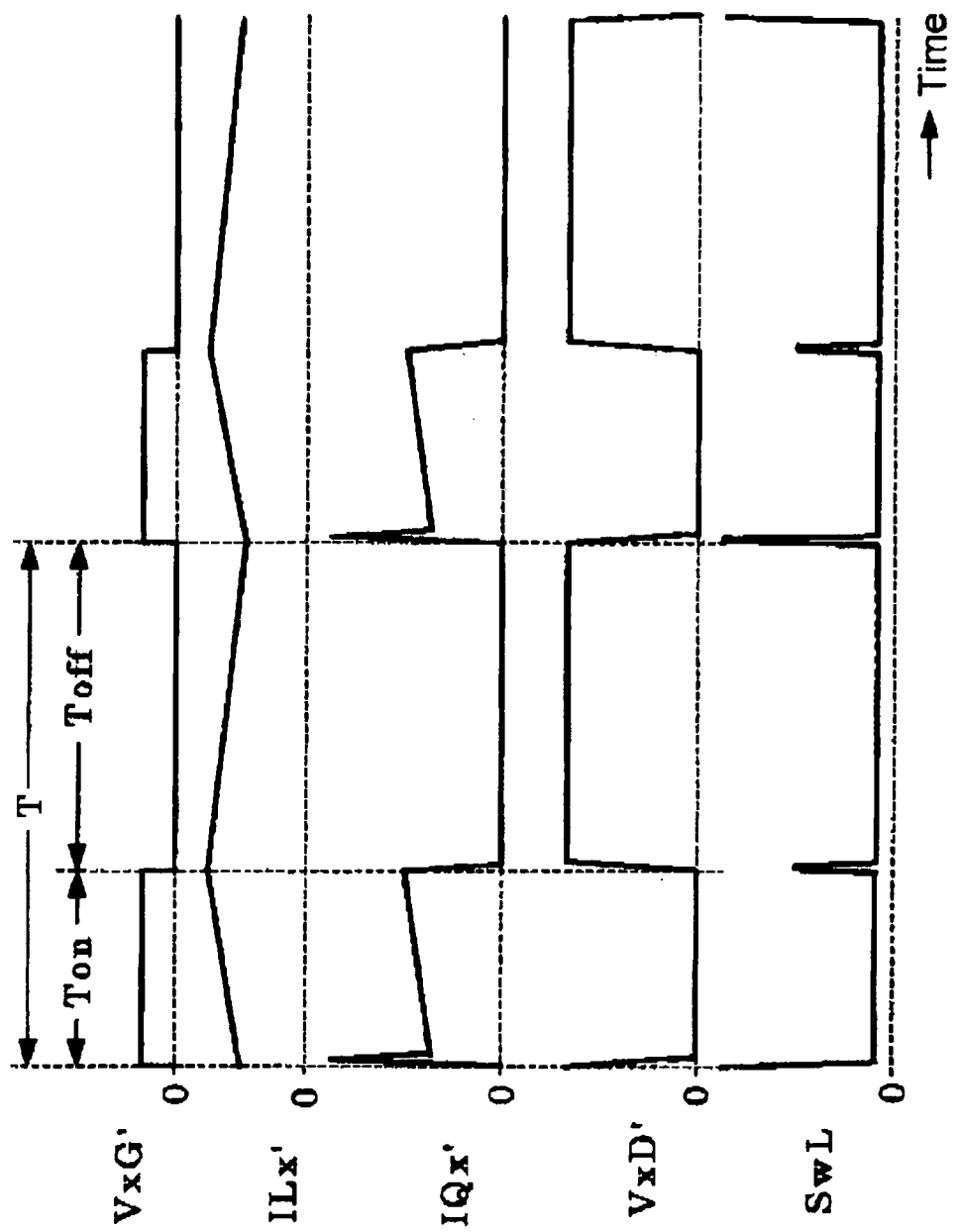
FIG. 19 shows a schematic of the voltages and of the current waveforms of the circuit arrangement of a conventional DC-DC converter of the voltage reduction type.

FIG. 1 shows the arrangement of the circuit of a DC-DC converter of the invention in a simplified representation. FIG. 2 shows essentially the respective waveform in the circuit shown in FIG. 1. FIG. 17 shows the waveforms measured in reality for information purposes for some of the waveforms shown in FIG. 2.

This circuit has the same arrangement as in the conventional DC-DC converter of the voltage reduction-buck type, in which the following takes place:

during the interval in which the main switching device (Qx) which includes a FET or the like is in the ON state, a current flows from the DC source (Vin) via the main coil (Lx) which is series connected to the main switching device (Qx). Here, furthermore, the smoothing capacitor (Cx) of the main coil (Lx) which is connected to the terminal opposite the main switching device (Qx) is charged, current is supplied to the load (Zx) which is connected in parallel to the smoothing capacitor (Cx) and moreover energy in the form of a flux is stored in the main coil (Lx). During the interval in which the main switching device (Qx) is in the OFF state, the smoothing capacitor (Cx) is charged by the energy stored in the main coil (Lx) in the form of a flux via the fly-wheel diode (Dx) in which a cathode is connected to one node between the main switching device (Qx) and the main coil (Lc) and current is supplied to the load (Zx).

In this circuit arrangement, in addition to the same arrangement as the arrangement of the conventional DC-DC converter of the voltage reduction-buck type, the following features are implemented:

the auxiliary transformer (Tw) is connected such that the primary winding (Pw), the DC source (Vin), the main switching device (Qx) and the fly-wheel diode (Dx) are series connected.

Furthermore, the resonant capacitor (Cw) and the auxiliary switching device (Qw) are connected to the secondary winding (Sw) of the auxiliary transformer (Tw) such that they form a closed loop in which they are series connected.

Here, the basic principle is that the main switching device (Qx) and the auxiliary switching device (Qw) are operated such that one of the two is shifted into the OFF state when the other is in the ON state. However, control is exercised such that the auxiliary switching device (Qw) is shifted beforehand into the OFF state by a switch closing prohibition interval (τy), which is described below, before the main switching device (Qx) is shifted into the ON state.

During the interval shown in FIG. 2, from a time (t1) until a time (t2) is reached, the main switching device (Qx) is in the ON state. Power supply from the DC source (Vin) is carried out via the primary winding (Pw) of the auxiliary transformer (Tw). Here, in the secondary winding (Sw) at the auxiliary transformer (Tw), a voltage is also formed which corresponds to the winding ratio of the primary winding to the secondary winding of the auxiliary transformer (Tw). However, since the auxiliary switching device (Qw) connected to the secondary winding is in the OFF state, no current flows in the secondary winding (Sw). During this interval, therefore, the magnetic energy given in the auxiliary transformer (Tw) is stored. This energy is used to later carry out resonant operation.

If next at the time (t2), the main switching device (Qx) is shifted into the OFF state, the voltage of the DC source (Vin) is applied to the main switching device (Qx), by which in the parasitic electrostatic capacitance of the main switching device (Qx) therefore the electric charge is charged up to this voltage.

At the time (t2), the energy stored in the auxiliary transformer (Tw) is released simultaneously on the secondary side of the auxiliary transformer (Tw) by fly-back operation, by which the resonant current begins to flow in the closed loop composed of the secondary winding (Sw), the resonant capacitor (Cw) and the auxiliary switching device (Qw), and charging of the electrical charge begins in the resonant capacitor (Cw). With respect to the auxiliary switching device (Qw), it is, however, necessary to engineer the winding direction of the secondary winding of the auxiliary transformer (Tw) such that the current begins to flow via an antiparallel diode (Dqw) which is connected parallel to the auxiliary switching device (Qw). The resonance phenomenon here is an LC resonance by the inductance of the secondary winding (Sw) and the resonant capacitor (Cw).

The antiparallel diode (Dqw) is present as an outside element, for example, in the case in which the auxiliary switching device (Qw) is a MOSFET. It can also be used simply as such.

With respect to the timing for turning on the auxiliary switching device (Qw), it is advantageous to shift as quickly as possible the auxiliary switching device (Qw) into the ON state while ensuring enough time to prevent this timing from coinciding with the ON interval of the main switching device when the main switching device (Qx) is shifted into the OFF state. The reason for this is that, during the interval in which current is flowing in the antiparallel diode (Dqw), a forward voltage of the antiparallel diode (Dqw) forms and that if in doing so, the auxiliary switching device (Qw) is in the ON state, the forward voltage of the antiparallel diode (Dqw) can be reduced. By the same principle as in the case of a so-called synchronous rectification the loss in the antiparallel diode (Dqw) and in the auxiliary switching device (Qw) can be reduced; this is one of the advantages of the invention.

Since the peak value of the resonant current flowing in the secondary circuit of the auxiliary transformer (Tw) and the peak value of the resonant voltage applied to the resonance capacitor (Cw) are changed by the different constants of the components comprising the circuit, combinations of different constants can be used in conjunction with the maximum ratings of the components used and the costs are advantageous. For example, with respect to the winding ratio of the primary winding to the secondary winding of the auxiliary transformer (Tw) normally roughly 1 is sufficient, but an advantageous value within the range from 0.5 to 2 can be chosen.

The peak value of the voltage which has been applied to the resonant capacitor (Cw) is essentially proportional to the output wattage of the DC-DC converter of the voltage reduction-buck type. For example, for constant power regulation, the peak value of the voltage applied to the resonant capacitor (Cw) is essentially constant. In the case of a small output voltage, the peak value of the voltage applied to the resonant capacitor (Cw) is reduced, by which the possibility arises that resonant operation does not take place to a sufficient degree. However, since the output wattage is small, and since originally the switching loss is thus also small, for purposes of the invention, this is not regarded as disadvantageous. Therefore, to carry out resonant operation under the condition which is similar to the maximum utilization output wattage, the different constants of the components comprising the circuit can be adjusted.

In the circuit arrangement of the invention, by the measure that there are an auxiliary transformer (Tw) and a secondary circuit which are independent of the basic (conventional) DC-DC converter part of the voltage reduction-buck type, and that resonant operation is carried out, a reduction of the switching loss is desired. Therefore, the different constants of the switching devices comprising the resonant circuit, i.e., the parameters of the resonant circuit, can be adjusted essentially independently.

Therefore, it is possible to engineer such that, for example, to set the inductance of the primary winding (Pw) of the auxiliary transformer (Tw) to be intentionally smaller than the inductance of the main coil (Lx) and still achieve good resonant operation. This measure of the invention, results in that basic operation of the DC-DC converter part of the voltage reduction-buck type is fixed depending largely only on the inductance of the main coil (Lx), even under the conditions under which the output voltage changes greatly, as in the case in which the high pressure discharge lamp is used as a load.

On the other hand, since the primary winding (Pw) of the auxiliary transformer (Tw) is located in the line path in which energy is supplied to the basic DC-DC converter part of the voltage reduction-buck type, the magnetic energy which is stored in the auxiliary transformer (Tw) during the interval of the ON state of the main switching device (Qx), is essentially proportional to the energy which is supplied to the load during each period of switching operation. This relation hardly depends on the voltage applied to the load.

Therefore, when the wattage supplied to the load does not change greatly, the voltage charged in the resonant capacitor (Cw) does not change greatly under the conditions under which the output voltage changes greatly. The resonance phenomenon in the auxiliary transformer (Tw) which has only an intentionally smaller inductance than the main coil (Lx), becomes less susceptible to the fluctuation of conditions for the load as a result. This feature is one of the major advantages of the invention.

At the time (t3) which is shown in FIG. 2, the resonant voltage of the resonant capacitor (Cw) reaches a peak value, and the resonant current which is flowing in the secondary circuit of the auxiliary transformer (Tw) reaches 0 and then begins to flow in the direction opposite the previous direction. As was described above, it becomes apparent that zero voltage switching is achieved when the transition of the auxiliary switching device (Qw) into the ON state is completed within an interval (τx) which begins starting at the time (t2) which is prior to the time (t3) and at which the main switching device (Qx) is shifted into the OFF state during which current is flowing in the antiparallel diode (Dqw) and during which, for the voltage of the auxiliary switching device (Qw), only the forward voltage of the antiparallel diode (Dqw) is formed.

This means that, by setting the timing of shifting the auxiliary switching device (Qx) into the ON state to be shorter than the length of time of τxx of the interval (τx), such that enough time is ensured to prevent this timing from coinciding with the ON interval of the main switching device (Qx), the switching loss can also be kept low during switching operation of the auxiliary switching device (Qw). This is one of the major advantages of the invention.

As was described above, generally control is exercised such that, before the main switching device (Qx) reaches the ON state, the auxiliary switching device (Qw) is shifted beforehand into the OFF state at the time (t4) shown in FIG. 2 by a switch closing prohibition interval (τy).

As was described above, at the time (t2) within the interval during which the forward current is flowing in the main switching device (Qx), the current flowing in the primary winding (Pw) of the auxiliary transformer (Tw) is turned off. In this way, current begins to flow by fly-back operation in the secondary winding (Sw) with the direction. By turning off the current flowing in the secondary winding (Sw) at the time (T4), current likewise begins to flow by fly-back operation this time in the primary winding (Pw).

However, in this case, since the direction of the turned-off current of the secondary winding (Sw) is opposite that at the time (t2), current in the primary winding (Pw) also begins to flow in the opposite direction, i.e., in the direction in which the backward current flows in the main switching device (Qx). This means that current begins to flow via the line path which includes the primary winding (Pw) of the auxiliary transformer (Tw), the fly-wheel diode (Dx) and the antiparallel diode (Dqx) which is connected parallel to the main switching device (Qx), from the grounding terminal of the DC source (Vin) to the positive terminal.

In doing so, the electrical charge which is charged in the parasitic electrostatic capacitance of the main switching device (Qx), is withdrawn. Afterwards, during the interval in which current is flowing in the antiparallel diode (Dqx), a state is maintained on the two ends of the main switching device (Qx) in which only a forward voltage of the antiparallel diode (Dqx) is formed.

The antiparallel diode (Dqx) is present as an outside element, for example, in the case in which the auxiliary switching device (Qw) is a MOSFET. It can also be used simply as such.

The phenomenon that by fly-back operation at the time (t4) current flows from the ground terminal of the DC source (Vin) to the positive terminal means that the energy of resonant operation which has been transmitted to the secondary circuit of the auxiliary transformer (Tw) is regenerated in the DC source (Vin). One of the major advantages of the invention is that energy is not wasted.

As was described above, the main switching device (Qx) is shifted into the ON state at the time (t5) shown in FIG. 2 after expiration of the switch closing prohibition interval (τy), which starts when the auxiliary switching device (Qw) reaches the OFF state. This is completed within an interval with a state in which current is flowing in the antiparallel diode (Dqx) and in which only the forward voltage of the antiparallel diode (Dqx) forms on the two ends of the main switching device (Qx).

By this measure, the current flowing in the antiparallel diode (Dqx) finally reaches 0 at the time (t6) shown in FIG. 2. Zero voltage switching can be achieved when the current is next inverted and flows in the forward direction of the main switching device (Qx). This means that in transition operation of the main switching device (Qx) into the ON state the switching loss can be kept low and the advantage of the invention can be exploited.

FIG. 2 shows the interval (τz) from the time (t4) at which the auxiliary switching device (Qw) is shifted into the OFF state until the time (t6) at which the current flowing in the antiparallel diode (Dqx) reaches 0. The interval is depicted in the figure as relatively long for the ease of drawing. In actual switching operation the interval (τz) is a short interval since the parasitic electrostatic capacitance of the main switching device (Qx) is normally a few pF to a few dozen pF, therefore is small.

During the switch closing prohibition interval (τy), it is necessary to set the timing by which the auxiliary switching device (Qx) is shifted into the ON state to be shorter than the length of time τzz of the interval (τz) such that enough time is ensured to prevent this timing from coinciding with the ON interval of the main switching device (Qx). When this condition is satisfied, the switch closing prohibition interval (τy) can be set to be constant or can be changed depending on conditions.

As was described above, according to the first aspect of the invention in the transition operation of the main switching device (Qx) into the ON state the switching loss can be reduced. The auxiliary transformer (Tw) and the secondary circuit are arranged independently of the circuit arrangement of the basic DC-DC converter of the voltage reduction-buck type. Because the inductance of the primary winding (Pc) of the auxiliary transformer (Tw) is intentionally set to be smaller than the inductance of the main coil (Lx), the resonance phenomenon for the auxiliary transformer (Tw) becomes less susceptible to the fluctuation of conditions at the load. Therefore, the switching loss can be reduced in a wide, variable range of the continuity ratio of the main switching device.

Furthermore, if the parameters of the auxiliary transformer (Tw) and of the secondary circuit (Cw) are set in a suitable manner, the switching loss can be reduced in transition operation of the auxiliary switching device (Qw) into the ON state. Also, the energy of resonant operation which has been transmitted to the secondary circuit of the auxiliary transformer (Tw) can be regenerated in the DC source (Vin). Therefore, as a whole, a DC-DC converter with high efficiency can be built.

Figure 3:
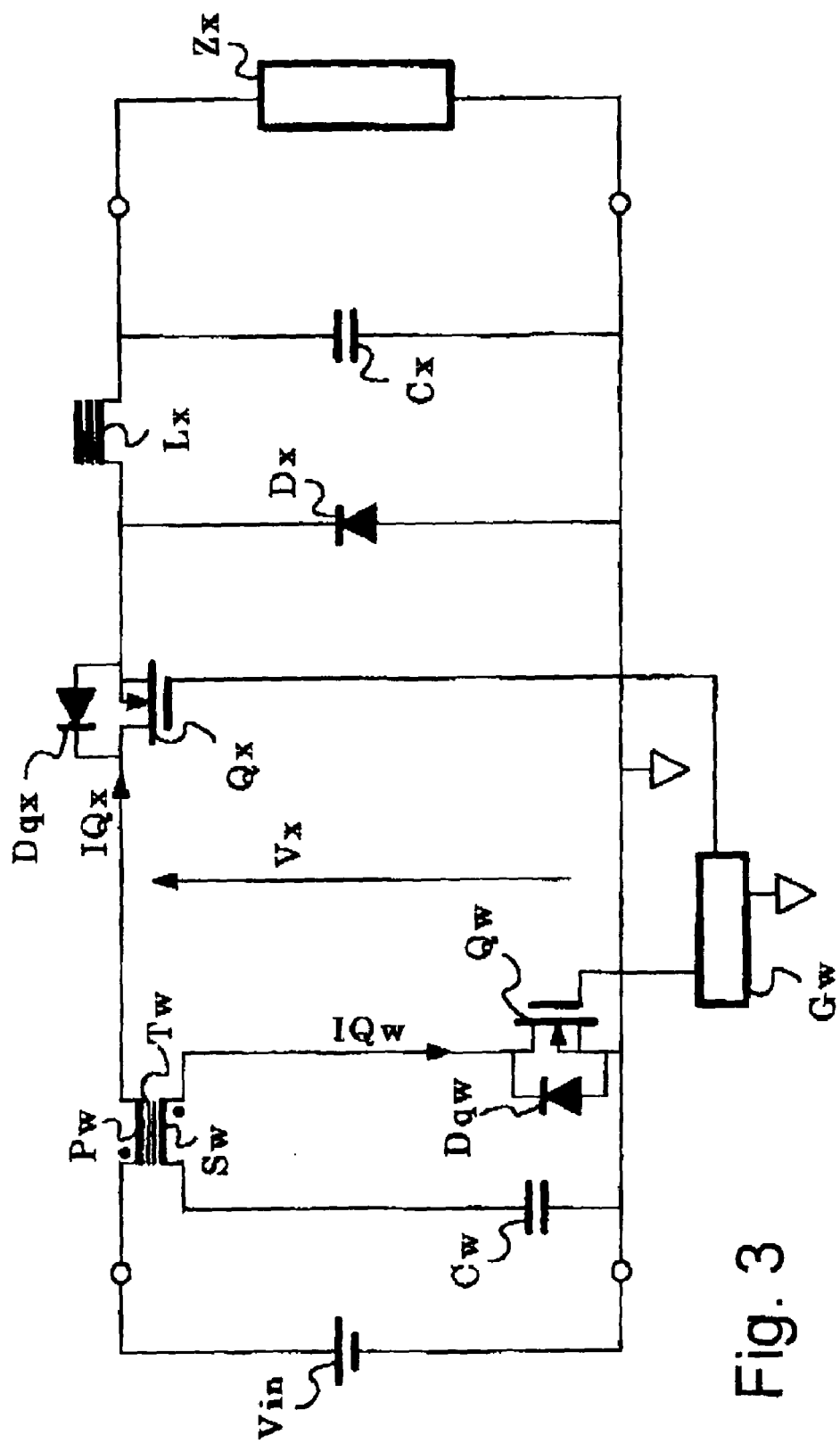
FIG. 3 shows a schematic of the circuit arrangement of a DC-DC converter according to one development of the first aspect of the invention.

The advantage of one development of the described invention is described below. FIG. 3 shows the arrangement of the DC-DC converter as of the invention in a simplified representation. The circuit arrangement in FIG. 3 differs from the circuit arrangement shown in FIG. 1 in that one end of the auxiliary switching device (Qw) is connected to the ground of the DC source (Vin). However, the basic operation is completely identical.

To control the efficiency of the converter with feedback, a means for determining the output voltage and a means for determining the output current are necessary so that the feedback control circuit acquires information about the output voltage and the output current. In order to do this with low costs, it is advantageous to use a voltage divider resistor or a shunt resistor. In order to transmit signals which have been determined by the voltage divider resistor or the shunt resistor to the feedback control circuit, it is necessary to connect the feedback control circuit, the voltage divider resistor and the a shunt resistor to nodes with a common electrical potential. It is advantageous for these nodes with a common electrical potential to be set to the ground of the DC source (Vin) on which the fluctuation of the electrical potential is small.

Here, by connecting one end of the auxiliary switching device (Qw) likewise to the ground of the DC source (Vin), the advantage can be gained that the number of parts with which ON-OFF control of the auxiliary switching device (Qw) is accomplished by the feedback control circuit can be reduced. For example, in the case in which the auxiliary switching device (Qw) is a FET, the gate terminal of the auxiliary switching device (Qw) can be directly driven by connecting the source terminal of the auxiliary switching device (Qw) to the ground of the DC source (Qw) by nonisolation signals from the feedback control circuit which is likewise connected to the ground of the DC source (Vin).

In the case in which the source terminal of the auxiliary switching device (Qw) is not connected to the ground of the DC source (Vin), when driving the gate terminal of the auxiliary switching device (Qw) based on the signals from the feedback control circuit, it is necessary to add a pulse transformer, a photocoupler, an IC which is called a high-side-driver, or the like for purposes of insulation.

A pulse transformer, a photocoupler, an IC which is called a high-side-driver, or the like have high costs and therefore are not advantageous since they lead to an increase in the volume and mass of the converter. Furthermore, they are not advantageous with respect to efficiency for the following reason that they produce specifically "dulling distortion" and signal delays. For example, in the implementation of a state in which the continuity ratio is small, in PWM control of the main switching device (Qx), for example, extinction of the signals from the feedback control circuit due to "dulling distortion" and signal delays occurs, by which the expected gate driving can no longer be done.

As was described above, according to one development of the first aspect of the invention, neither a pulse transformer, nor a photocoupler, nor an IC which is called a high-side-driver, nor the like are needed any longer for purposes of insulation. This is advantageous for implementation of a small, light, high-efficiency DC-DC converter with low costs.

Figure 4:
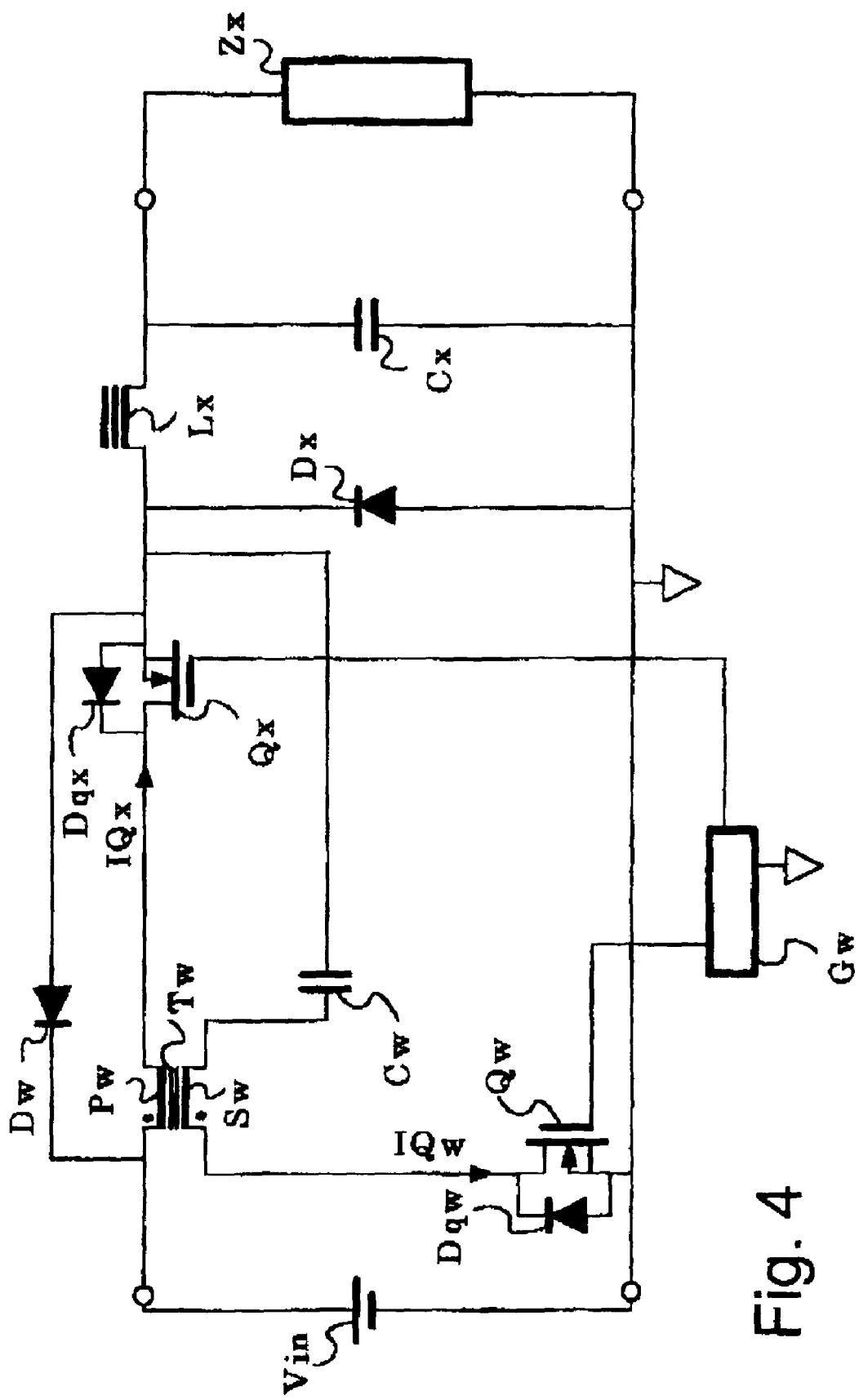
FIG. 4 shows a schematic of the circuit arrangement of a DC-DC converter according to a second aspect of the invention.

The advantage of the invention according to its second aspect is described below. FIG. 4 shows the arrangement of a DC-DC converter of the voltage reduction-buck type as of the invention in a simplified representation. The arrangement of this circuit is similar to the circuit arrangement which is shown in FIG. 3. However, the difference is that one end of the resonant capacitor (Cw) is connected to the nodal point between the main coil (Lx) and the fly-wheel diode (Dx).

Therefore, since the basic operation is essentially identical to the circuit described above using FIG. 1, it will not be described. However, the difference lies in the line path of the resonant current which flows in the secondary winding (Sw) of the auxiliary transformer (Tw). Specifically, during the interval during which the main switching device (Qx) is shifted into the OFF state and during which current is flowing in the antiparallel diode (Dqx) which is connected parallel to the auxiliary switching device (Qw), current can be supplied to the load (Zx) by the resonant current via the main coil (Lx); this becomes advantageous for reducing the ripple component of the current.

Figure 5:
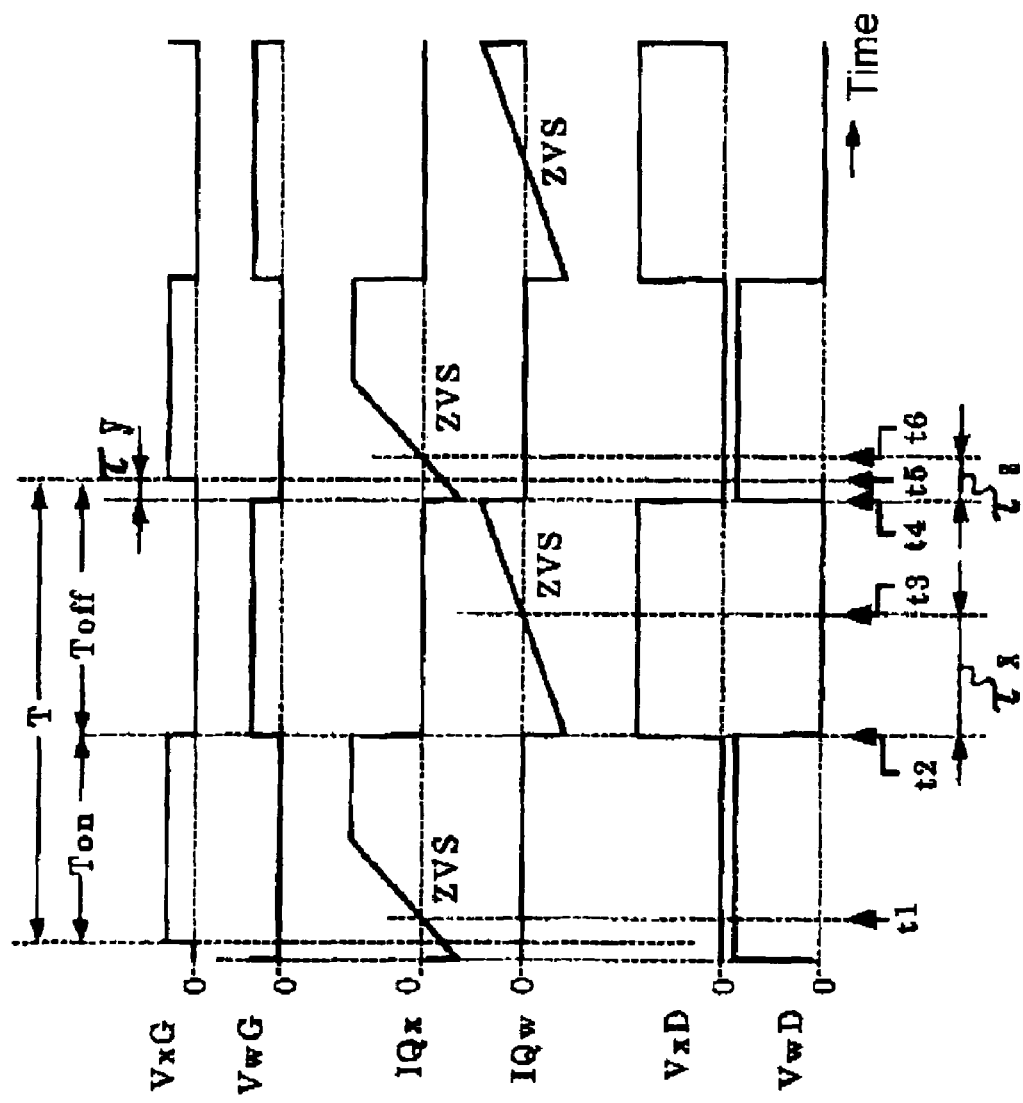
FIG. 5 shows a schematic of the voltages and of the current waveforms which correspond to the circuit arrangement of the DC-DC converter according to the second aspect of the invention.

FIG. 5 shows essentially the respective waveform of the circuit described above using FIG. 4. That in the transition of the main switching device (Qx) and of the auxiliary switching device (Qw) into its respective ON state, is identical to the circuit described above using FIG. 1. A DC-DC converter with high efficiency can be implemented in which the switching loss is low.

Parallel to the series connection of the primary winding (Pw) of the auxiliary transformer (Tw), a diode (Dw) was connected to the main switching device (Qx) in order to avoid the following case:

There is specifically a case in which, relatively great ringing arises at the electrical potential of the node of the nodal point between the main switching device (Qx) and the main coil (Lx) in the transition of the main switching device (Qx) into the ON state. In the case in which, due to the presence of this ringing, neither the disadvantage that, for example, the rated values of the switching devices are exceeded nor a similar disadvantage occurs, the diode (Dw) can also be omitted.

In this circuit arrangement, one end of the auxiliary switching device (Qw) is also connected to the ground of the DC source (Vin). For this reason, it is advantageous for implementation of a small, light, high-efficiency DC-DC converter with low costs.

As was described above, in the DC-DC converter as of the invention, zero voltage switching operation is achieved both by the main switching device (Qx) and also by the auxiliary switching device (Qw). Thus, a reduction of noise is also achieved simultaneously with reduction of the switching loss.

The advantage of the device as of the invention is described below. As was described in the prior art, the discharge voltage of a high pressure discharge lamp changes greatly and also vigorously depending on the discharge state, i.e., the state in which a no-load voltage is applied (state before the start of discharge), the glow discharge state, the state of a transient arc discharge, the state of a steady-state arc discharge. Therefore, the converter for supply of a high pressure discharge lamp is required to have the property which enables a prompt change of the continuity ratio according to the discharge voltage of the high pressure discharge lamp in a wide, variable range with PWM control. Furthermore, there is a demand for a property that enables maintenance of operation in which the switching loss is reduced by resonance operation.

As was described above, in the DC-DC converter of the voltage reduction-buck type there are an auxiliary transformer (Tw) and a secondary circuit independently of the circuit arrangement of the underlying DC-DC converter of the voltage reduction-buck type. Because the inductance of the primary winding (Pw) of the auxiliary transformer (Tw) is set intentionally smaller than the inductance of the main coil (Lx), the resonance phenomenon for the auxiliary transformer (Tw) becomes less susceptible to the conditions at the load. Therefore, the switching loss can be reduced in a wide, variable range of the continuity ratio of the main switching device. As a result, it is suited as a converter for supply of a high pressure discharge lamp. A device for operating a high pressure discharge lamp which is arranged using it therefore works advantageously.

Figure 6:
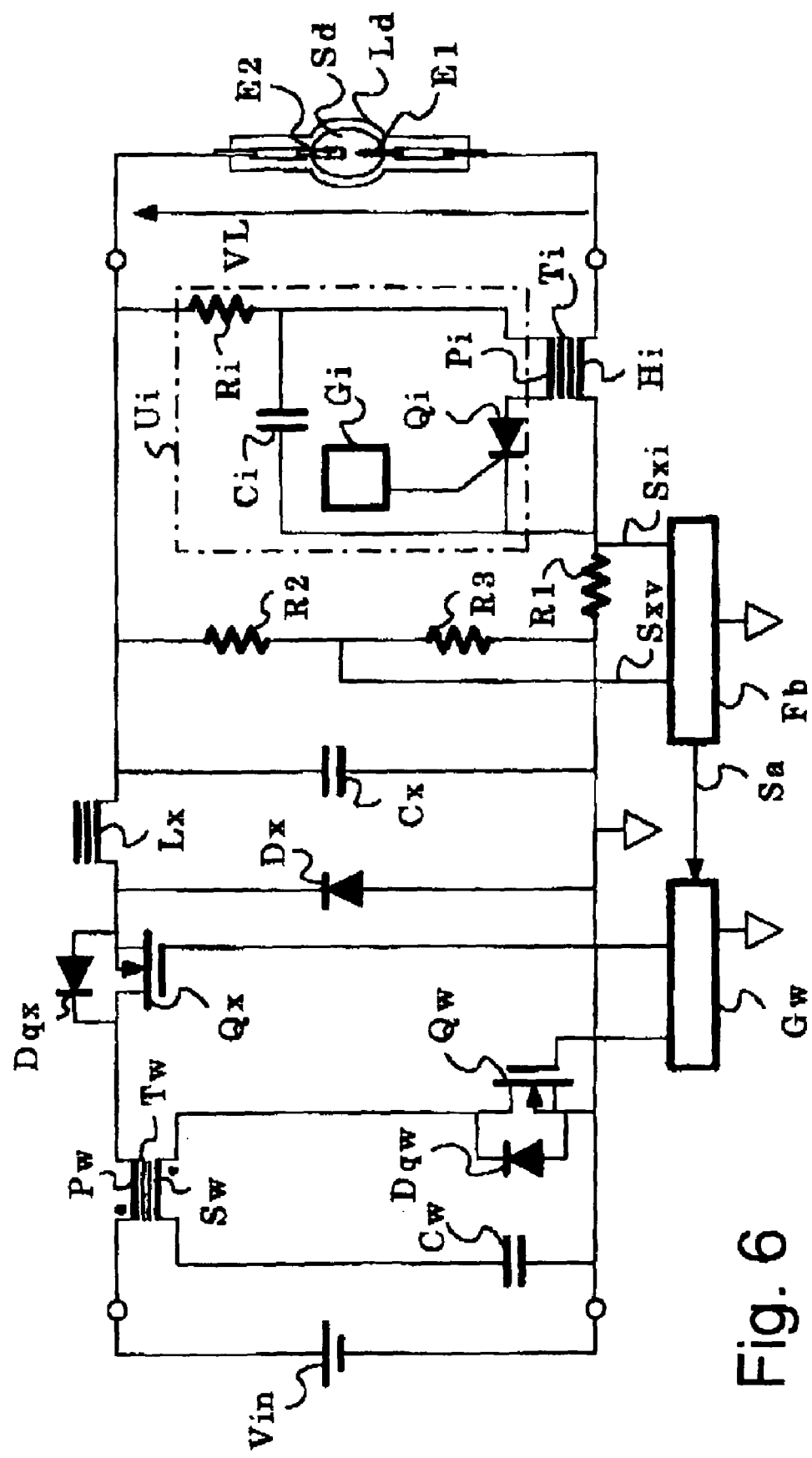
FIG. 6 shows a schematic of the circuit arrangement of a DC-DC converter of the device of the invention.

FIG. 6 shows the circuit arrangement of a device for operating a high pressure discharge lamp (Ld) in a simplified representation, in which the DC-DC converter for supplying a high pressure discharge lamp is the DC-DC converter of the voltage reduction-buck type as of the invention which was described above using FIG. 3.

To obtain a device for operating a high pressure discharge lamp (Ld), in addition to FIG. 3, there are a starter (Ui), a shunt resistor (R1) as the output current detector, voltage divider resistors (R2, R3) as the output voltage detectors and a feedback control element (Fb).

In the starter (Ui), a capacitor (Ci) is charged via a resistor (Ri) by a lamp voltage (VL). When the gate driver circuit (Gi) is activated, by closing the switching device (Qi) which includes a thyristor or the like, the capacitor (Ci) is discharged by the primary winding (Pi) of the transformer (Ti), by which in the secondary winding (Hi) a high voltage pulse is formed which is applied between the electrodes (E1, E2) of the two poles of the high pressure discharge lamp (Ld). In this way, within the discharge space (Sd) an insulation breakdown occurs and the discharge of the high pressure discharge lamp (Ld) begins.

A lamp current determination signal (Sxi) is input by the shunt resistor (R1) and lamp voltage determination signals (Sxv) are input by the voltage divider resistors (R2, R3) to the feedback control element (Fb) from which a PWM signal (Sa) is sent to the driver control element (Gw). The driver control element (Gw) carries out drive control of the main switching device (Qx) and of the auxiliary switching device (Qw) in this way.

The feedback control element (Fb) based on the lamp voltage determination signal (Sxv) before the start of discharge of the high pressure discharge lamp (Ld) carries out feedback control of the no-load voltage. That the starter (Ui) produces a high voltage pulse and that the discharge of the high pressure discharge lamp (Ld) has begun, can be determined by the feedback control element (Fb), for example, by the lamp current determination signal (Sxi).

Furthermore, the feedback control element (Fb) carries out the following:

The lamp wattage setpoint is divided by the lamp voltage value which is computed by the lamp voltage determination signal (Sxv);

In this way, the lamp current setpoint is computed at this instant;

A lamp current setpoint signal which corresponds to this lamp current setpoint is generated internally; and Feedback control of the lamp current is carried out such that the difference between it and the lamp current determination signal (Sxi) is reduced.

However, as described above, since immediately after the transition into a transient arc discharge via a glow discharge, the lamp voltage is low and since the lamp current setpoint computed according to this lamp voltage value becomes unduly large, it is advantageous to exercise control such that the lamp current value is kept at the upper boundary value until finally the lamp voltage increases and until an appropriate lamp current setpoint is computed.

Of course, it is apparent from the description above that the device for operating a high pressure discharge lamp also operates advantageously in an arrangement by the DC-DC converter of the voltage reduction-buck type as of the invention described in FIG. 1 and FIG. 4.

Figure 7:
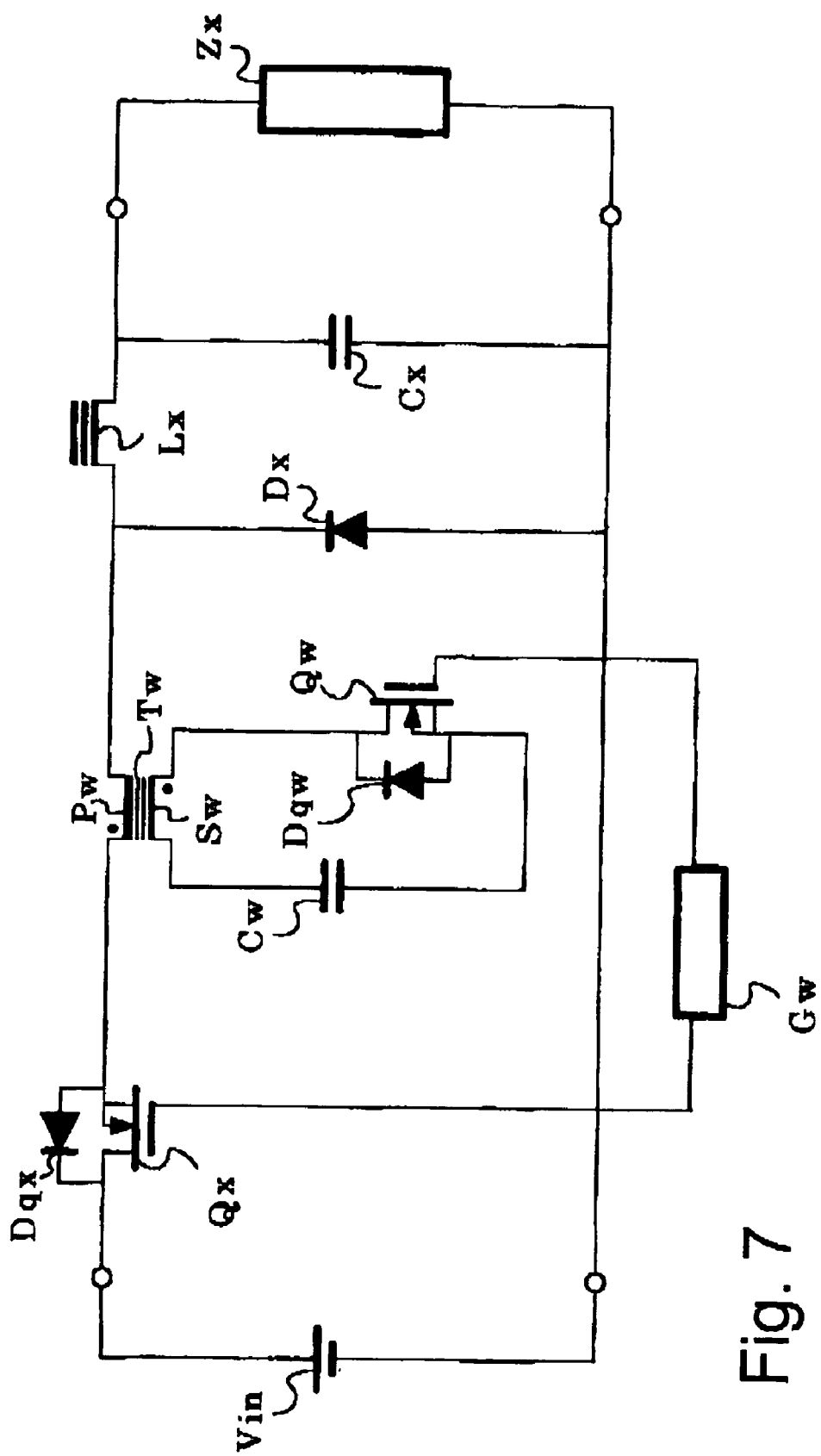
FIG. 7 shows a schematic of one embodiment according to the first aspect of the invention.

FIG. 7 shows another embodiment of the invention according to its first aspect. Here a version of a DC-DC converter as of the invention is shown in which the auxiliary transformer (Tw) is located downstream of the main switching device (Qx). Here, the same action as in FIG. 1 can be achieved.

Figure 8:
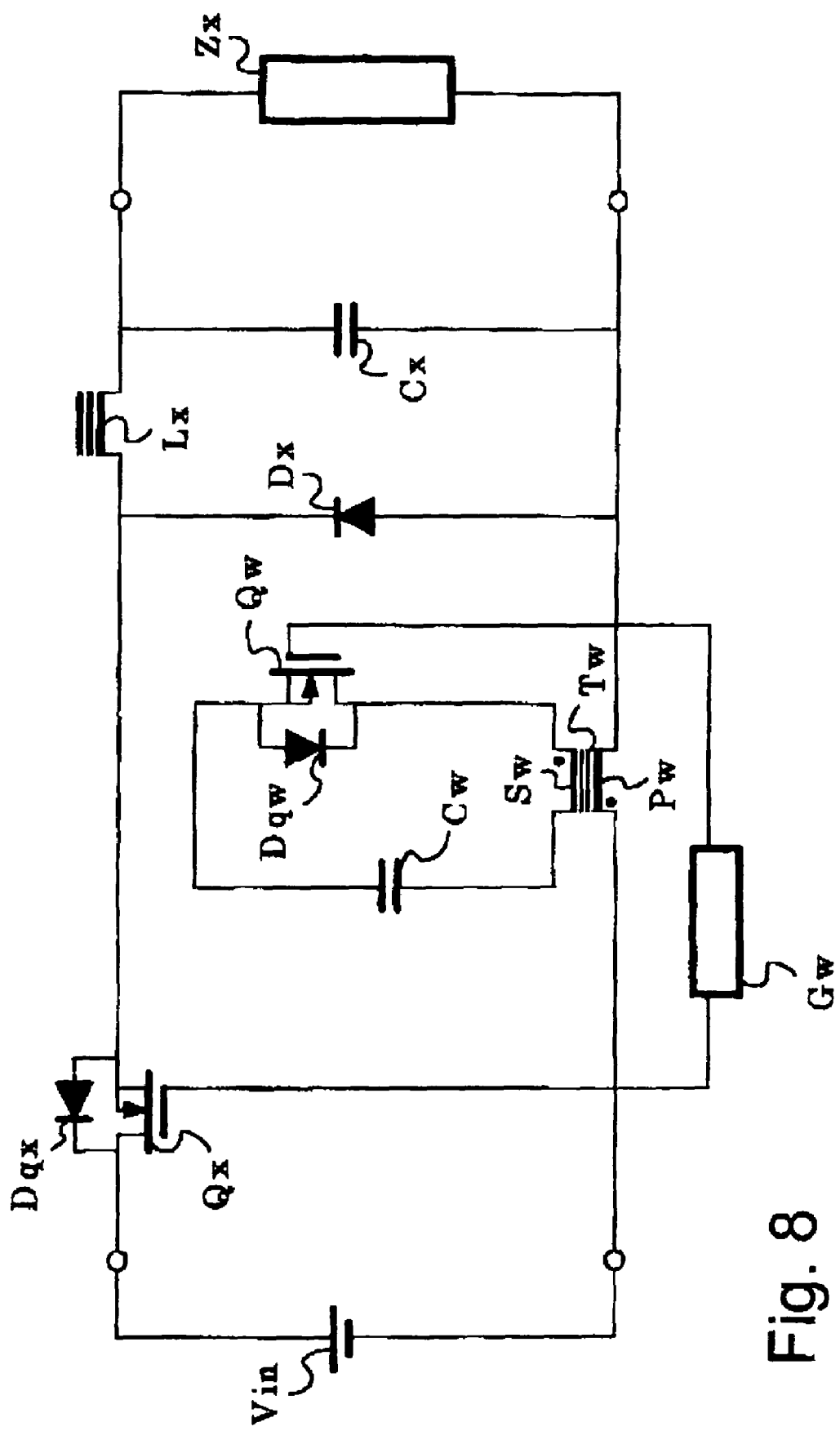
FIG. 8 shows a schematic of another embodiment according to the first aspect of the invention.

FIG. 8 shows another embodiment of the first aspect of the invention. A version of a DC-DC converter of the invention is shown here in which the auxiliary transformer (Tw) is located on a line (ground line) of the DC source (Vin) which is opposite the line on which the main switching device (Qx) and the main coil (Lx) are located next to one another. Here, the same action as in FIG. 1 can be achieved.

Figure 9:
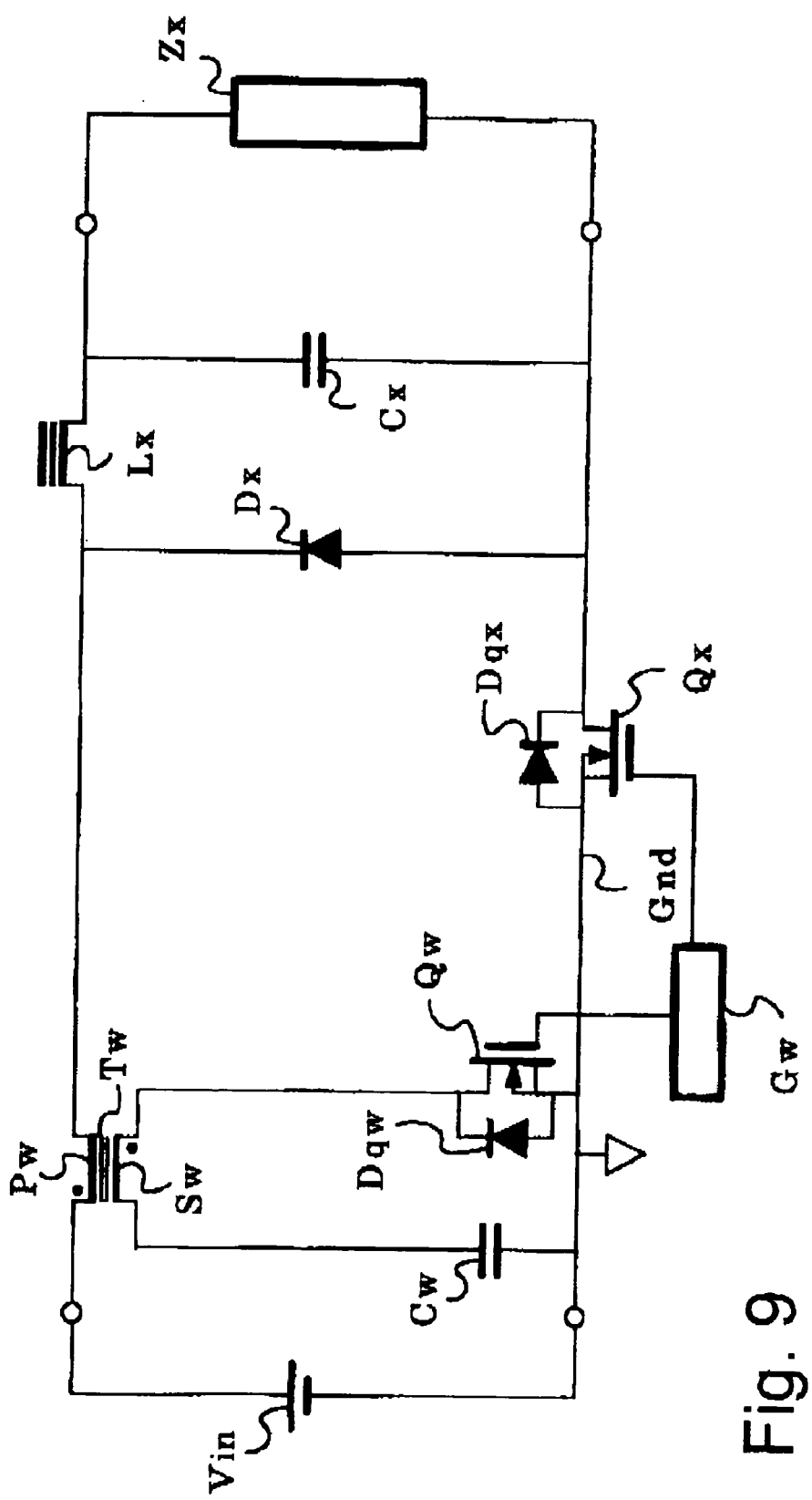
FIG. 9 shows a schematic of another embodiment according to the first aspect of the invention.

FIG. 9 shows an embodiment of a development of the first aspect of the invention. A version of a DC-DC converter of the invention is shown here in which the two source terminals of the main switching device (Qx) and of the auxiliary switching device (Qw) are connected to nodes on the ground side (Gnd) of the DC source (Vin). It is assumed that the main switching device (Qx) and the auxiliary switching device (Qw) are, for example, FETs.

If the ground of the current source for a control circuit for control of these switching devices is likewise located on nodes on the ground side (Gnd) of the DC source (Vin), for gate driving the main switching device (Qx) and of the auxiliary switching device (Qw), an insulating gate driving means, such as a pulse transformer, a photocoupler, a high-side-driver or the like is no longer needed. Therefore, the same action as in FIG. 3 can be achieved, costs can be cut and a small, light converter can be achieved.

Figure 10:
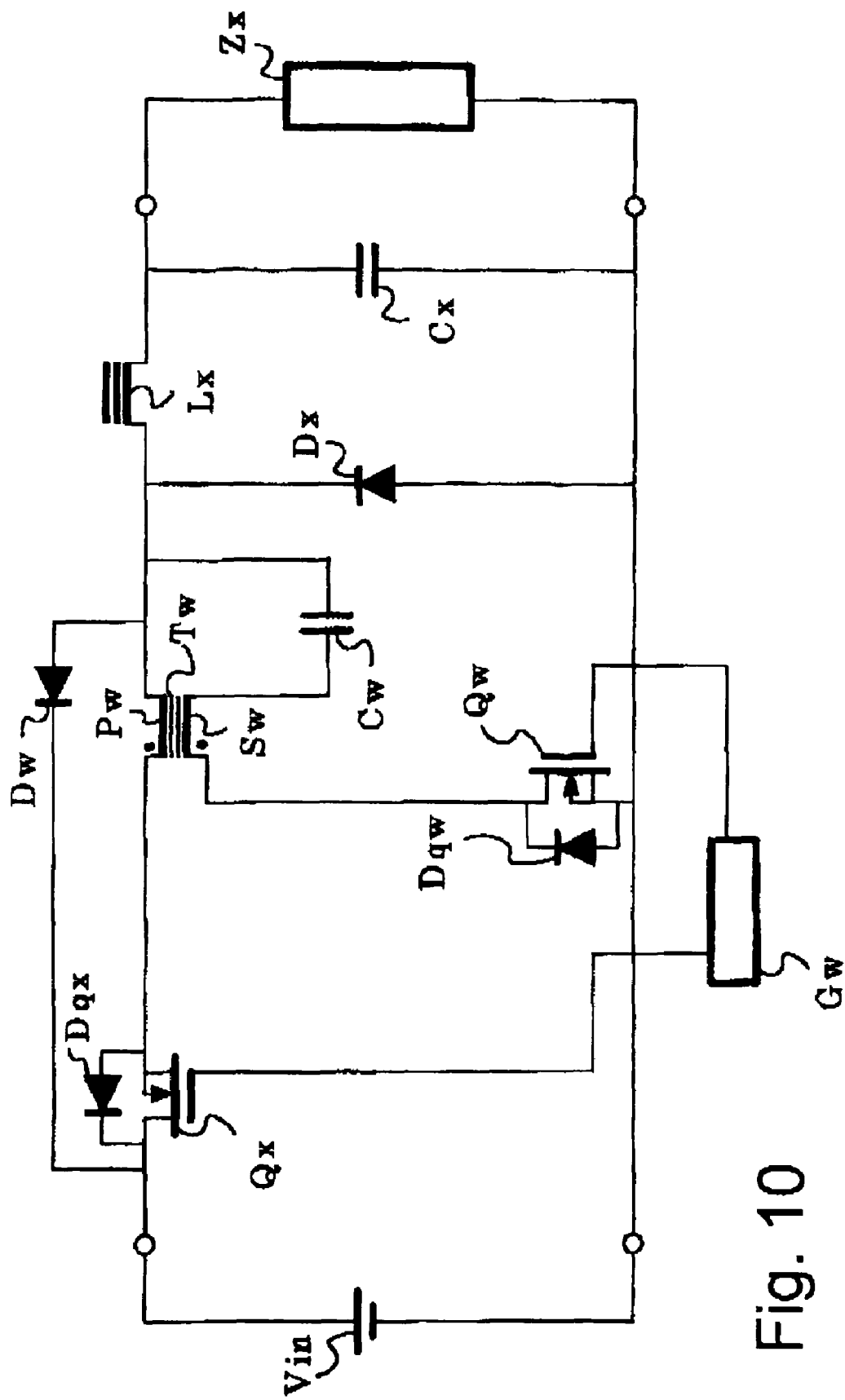
FIG. 10 shows a schematic of another embodiment according to the second aspect of the invention.

FIG. 10 shows an embodiment of the second aspect of the invention. A version of a DC-DC converter as of the invention is shown in which the auxiliary transformer (Tw) is located downstream of the main switching device (Qx). Here, the same action as in FIG. 4 can be achieved.

Figure 11:
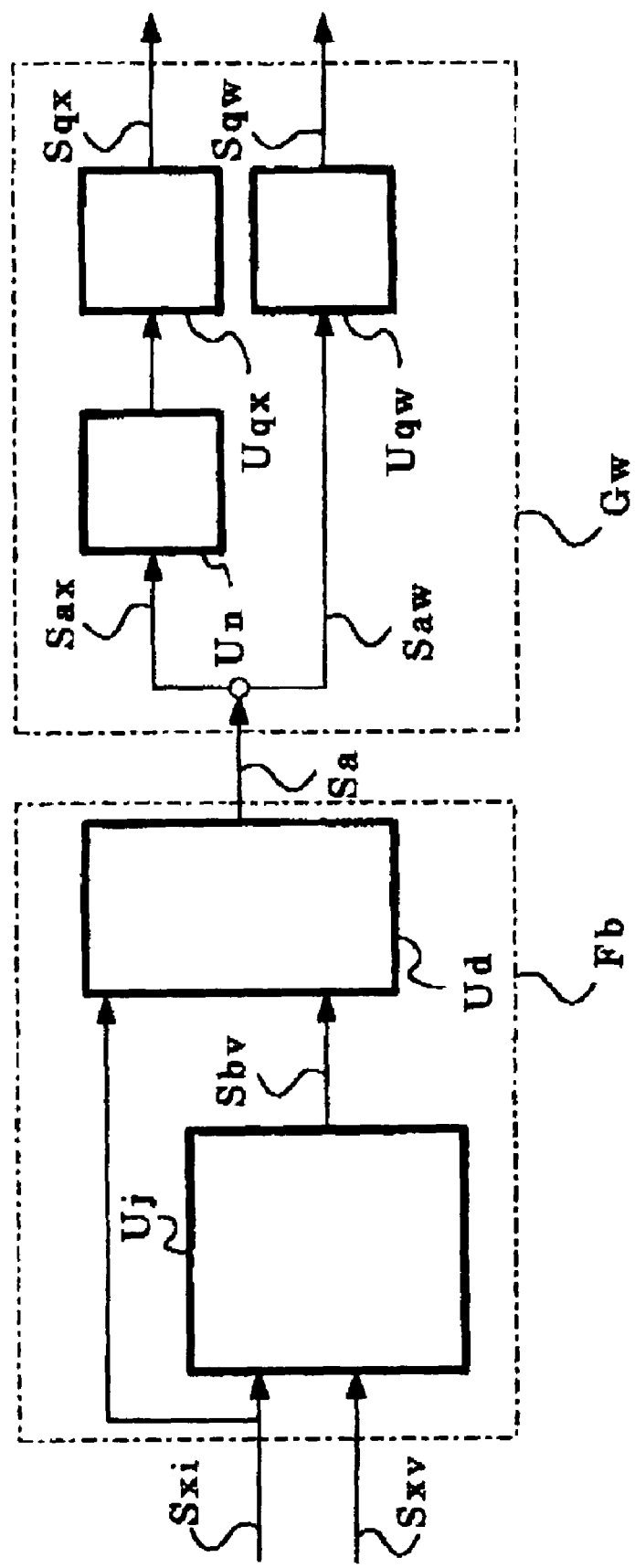
FIG. 11 shows a schematic of the arrangement of a driver control element (Gw) and a feedback control element (Fb) of the DC-DC converter of the invention.

FIG. 11 shows the arrangement of the driver control element (Gw) and the feedback control element (Fb) of a DC-DC converter as of the invention in a simplified representation.

The feedback control element (Fb) is composed of a driving capacity control circuit (Ud) which carries out pulse width modulation with feedback such that the difference between the lamp current setpoint signal (Sbv) and the lamp current determination signal (Sxi) is reduced at this instant, the lamp current setpoint signal (Sbv) being computed by an arithmetic circuit (Uj) which computes the lamp current setpoint by dividing the lamp wattage setpoint by a lamp voltage value which is computed on the basis of lamp voltage determination signal (Sxv).

The PWM signal (Sa) is output by the driving capacity control circuit (Ud). Here, since the main switching device (Qx) and the auxiliary switching device (Qw) must be shifted in alternation into the ON state, the main switching PWM signal (Sax) which is to become the drive signal of the main switching device (Qx) and the inversion signal of it, i.e., the auxiliary switching PWM signal (Saw) which is to become the a drive signal of the auxiliary switching device (Qw), are generated. They are converted by the driver control element (Gw) into signals for driving of the switching devices.

Since control is exercised in such a way that only after the auxiliary switching device (Qw) reaches the OFF state is the main switching device (Qx) shifted into the ON state within a given time τzz, by adding a delay circuit (Un) for delaying the timing for driving of the main switching device (Qx), this time can be regulated.

Next, there are circuits for driving the main switching device (Qx) and the auxiliary switching device (Qw), for example, driver circuits (Uqx, Uqw) composed of a pulse transformer, a high-side-driver or the like. In this way, for the respective switching device, driver signals (Sqx, Sqw) are generated and the respective switching device is subjected to ON-OFF control.

A microprocessor (not shown) can be installed in the feedback control element (Fb), and thus, the discharge state of the high pressure discharge lamp can be identified and a relatively complicated sequence which is subject to normal operation control can be processed. Here it is advantageous to proceed as follows:

The lamp voltage determination signal (Sxv) is converted by AD conversion into a lamp voltage value;

The computation of the lamp current setpoint which satisfies the lamp wattage setpoint is done by the microprocessor.

A lamp current setpoint signal is generated by a D/A converter.

Figure 12:
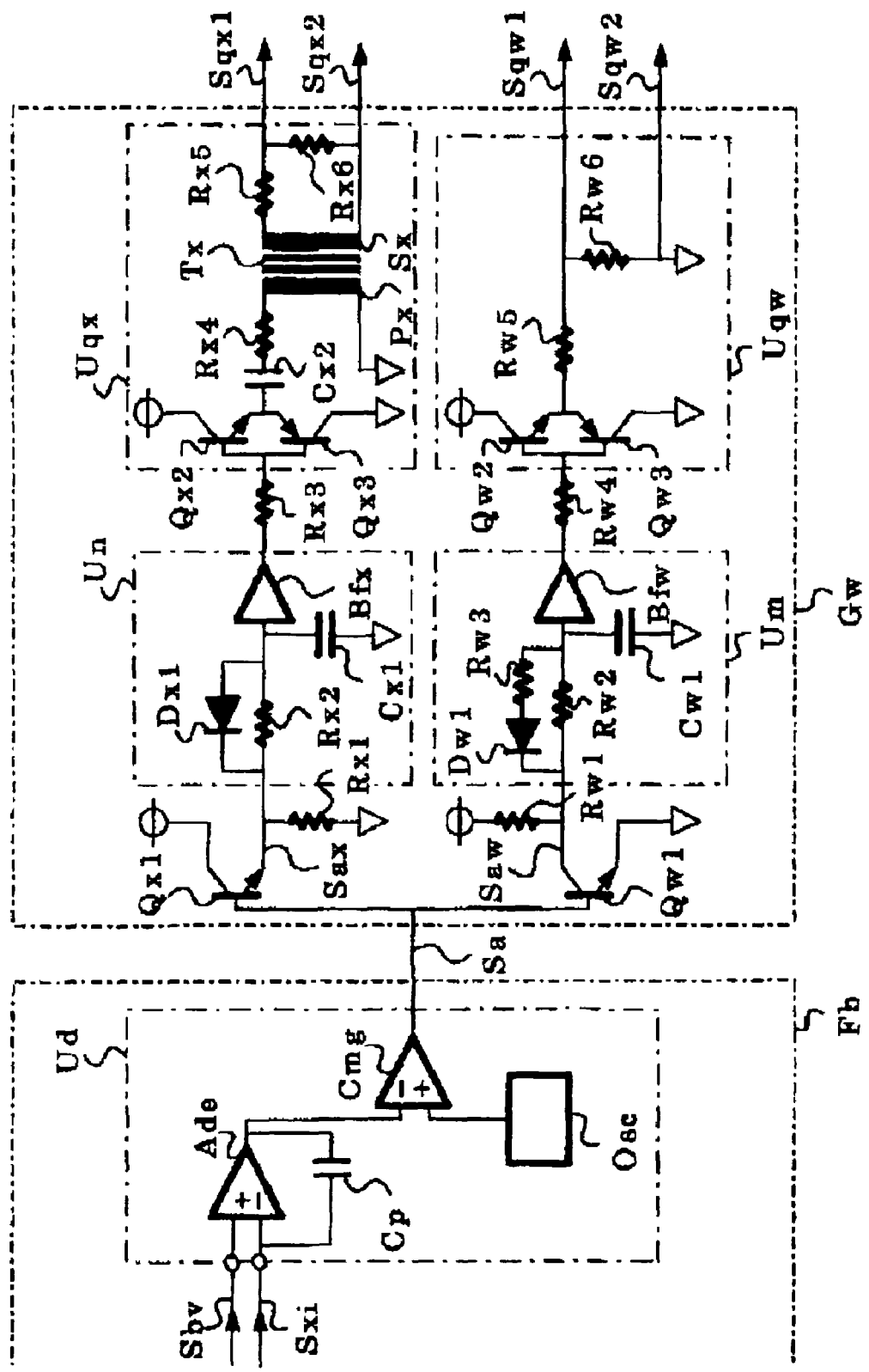
FIG. 12 shows a schematic of one embodiment of the circuit arrangement of the driver control element (Gw) and of part of the feedback control element (Fb) of a DC-DC converter as of the invention.

FIG. 12 shows an embodiment of part of the feedback control element (Fb) of the invention and of the circuit arrangement of the driver control element (Gw) of a DC-DC converter. The driver control element (Gw) shown in FIG. 12 corresponds, for example, to the device shown in FIG. 6 for operating the high pressure discharge lamp. For driving the auxiliary switching device (Qw), an insulating gate driving means, such as a pulse transformer, a photocoupler, a high-side-driver or the like, is not necessary. Here, the arrangement of the arithmetic circuit (Uj) shown in FIG. 11 is not described. The arithmetic circuit (Uj) outputs the lamp current setpoint signal (Sbv) to the driving capacity control circuit (Ud).

Next, in the driving capacity control circuit (Ud), the lamp current determination signal (Sxi) at this time and the lamp current setpoint signal (Sbv) is compared by an error operational amplifier (Ade) which includes a capacitor (Cp). In this way the PWA signal (Sa) is generated such that this comparison result finally becomes a gate signal which is subjected to PWM control for the main switching device (Qx).

On the other hand, for the gate signal of the auxiliary switching device (Qw), the main switching device (Qx) and the auxiliary switching device (Qw) are shifted alternately into the ON state. Therefore the PWM signal (Sa) and its inversion signal are required. Therefore, with respect to the PWM signal (Sa) there are two switching devices (Qx1, Qw1). The switching device (Qx1) is an emitter followed by a resistor (Rx1) and generates the main switching PWM signal (Sax) which is an in-phase signal like the PWM signal (Sa). A resistor (Rw1) is connected to the switching device (Qw1). Furthermore, the switching device (Qw1) is an emitter ground and generates an auxiliary switching PWM signal (Saw) which is an inversion signal with respect to the PWM signal (Sa).

Here, the main switching PWM signal (Sax) is output via a buffer (Bfx) to the next stage, since a delay circuit is formed which follows the time constant of a CR circuit which includes a resistor (Rx2) and a capacitor (Cx1). In this delay circuit, in the case of reaching "High," a delay can be taken to a sufficient extent. Conversely, in the case in which the voltage of the buffer (Bfx) drops from "High" to "Low," control is exercised in such a way that a diode (Dx1) is added parallel to the resistor (Rx2), an electrical charge is quickly withdrawn from the capacitor (Cx1), and thus, the delay time is shortened. As a result, only the signal when the main switching device (Qx) is turned on is delayed.

Then, the signal which has been output from the buffer (Bfx) is transmitted via a base resistor (Rx3) to a driver circuit (Uqx) for driving of the main switching device (Qx). From the nodal point between the driver circuit (Uqx) and the switching devices (Qx2, Qx3), a signal is transmitted to the primary winding (Px) of the pulse transformer (Tx) via a capacitor (Cx2) and a resistor (Rx4) as the current limitation resistor. A resistor (Rx5) which is to become the gate resistor of the main switching device (Qx) is connected from the secondary winding (Sx) of the pulse transformer (Tx). A resistor (Rx6) which is connected between the drain and the source electrode for smoothly turning off the main switching device (Qx) is connected to it. These signals (Sqx1, Sqx2) are transmitted to the main switching device (Qx).

On the other hand, a delay is added to the auxiliary switching PWM signal (Saw) by a delay circuit (Um) which likewise includes resistors (Rw2, Rw3), a capacitor (Cw1), a diode (Dw1) and a buffer (Bfw). The signal which has been output via the buffer (Bfw) is transmitted to the switching devices (Qw2, Qw3) via the base resistor (Rw4). Proceeding from the nodal point, a gate resistor (Rw5) of the auxiliary switching device (Qw) and a resistor (Rw6) which is connected between the drain and the source electrode are connected between the switching devices (Qw2, Qw3) for smoothly turning off the auxiliary switching device (Qw). Generated signals (Sqw1, Sqw2) are transmitted to the auxiliary switching device (Qw).

By this arrangement, in the control circuit shown in FIG. 12, the device of the invention for operating a high pressure discharge lamp can be controlled with feedback such that the error between the lamp current determination signal (Sxi) and the lamp current setpoint signal (Sbv) decreases. Here, the main switching device (Qx) and the auxiliary switching device (Qw) can be subjected to ON-OFF control in such a way that the switching loss is reduced. Here, there are delay circuits (Un, Um) for the main switching PWM signal (Sax) and the auxiliary switching PWM signal (Saw) for the two switching devices, specifically for the main switching device (Qx) and the auxiliary switching device (Qw). In this way, the switching devices are prevented from being turned on at the same time. This measure avoids the risk as a result of deviant timing of switch driving or due to similar factors and a secondary disadvantage which results thereby.

For example, TL494 from Texas Instruments or the like can be used as a commercial IC in which functional units such as the error operational amplifier (Ade) described above using FIG. 12, the oscillator (Osc) shown in FIG. 12, the comparator (Cmg) shown in FIG. 12 for comparison with an oscillated triangular waveform, the switching devices (Qx1, Qw1) and the like are integrated.

Figure 13:
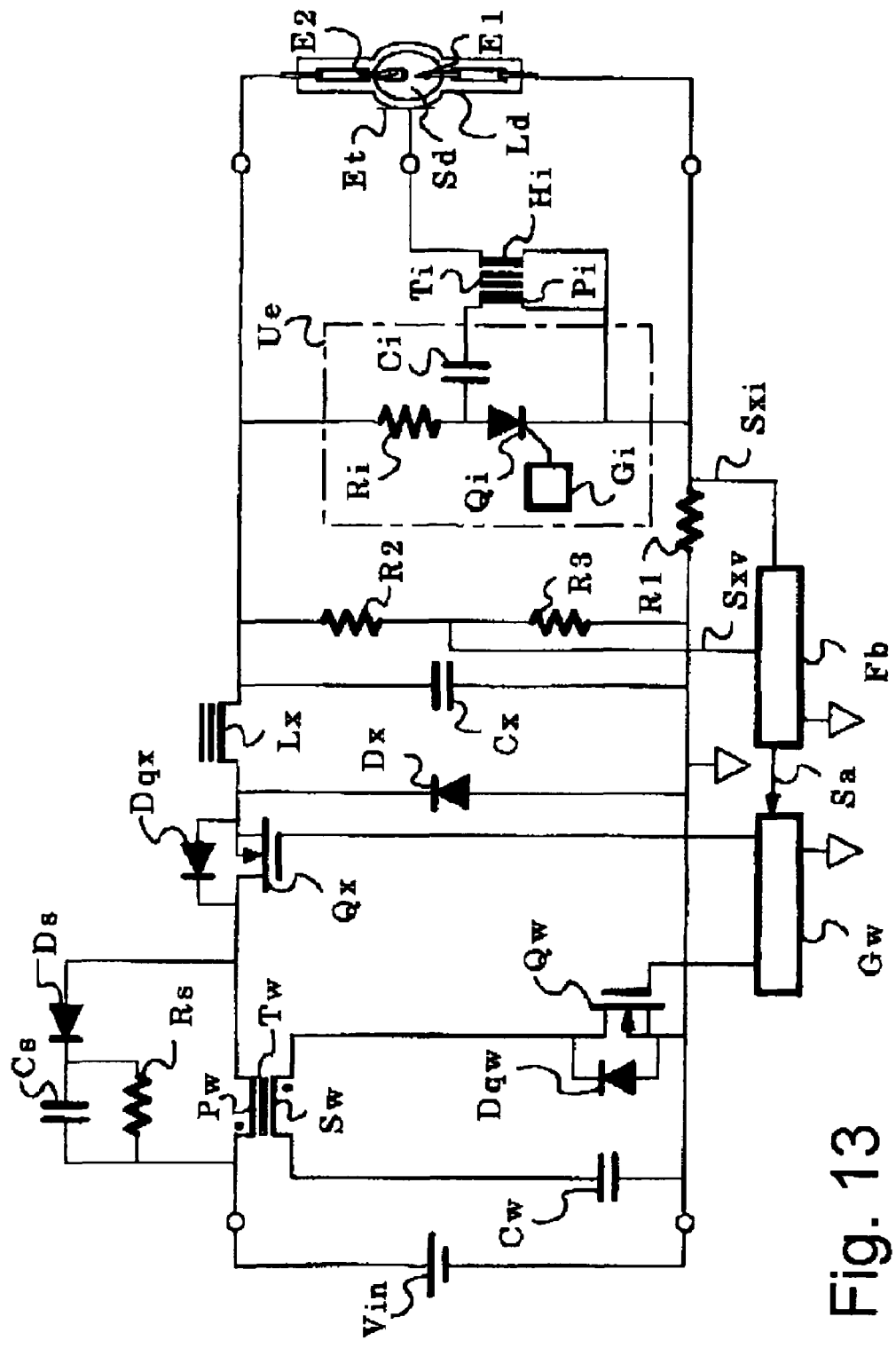
FIG. 13 shows a schematic of one embodiment of the device of the invention.

FIG. 13 shows one embodiment of the device of the invention. This embodiment is a device for operating a high pressure discharge lamp using a starter which is called an external trigger type. In the high pressure discharge lamp (Ld) there is an auxiliary electrode (Et) besides the electrodes for the main discharge such that it does not come into contact with the discharge space (Sd). Between this auxiliary electrode (Et) and the first and second electrodes a high voltage is applied, by which a plasma is produced in the discharge space (Sd). The main discharge is started by a voltage (no-load voltage) which has been applied beforehand between the first electrode and the second electrode, the plasma acting as the trigger.

In the arrangement of the DC-DC converter part shown in FIG. 13, a circuit is added to the arrangement described above using FIG. 6; it is called a snubber circuit and includes a diode (Ds), a capacitor (Cs) and a resistor (Rs). In this way the disadvantages of a surge and of noise which form at the instant the main switching device (Qx) is turned off can be eliminated as a result of the cross inductance of the auxiliary transformer (Tw) or due to similar factors.

Figure 14:
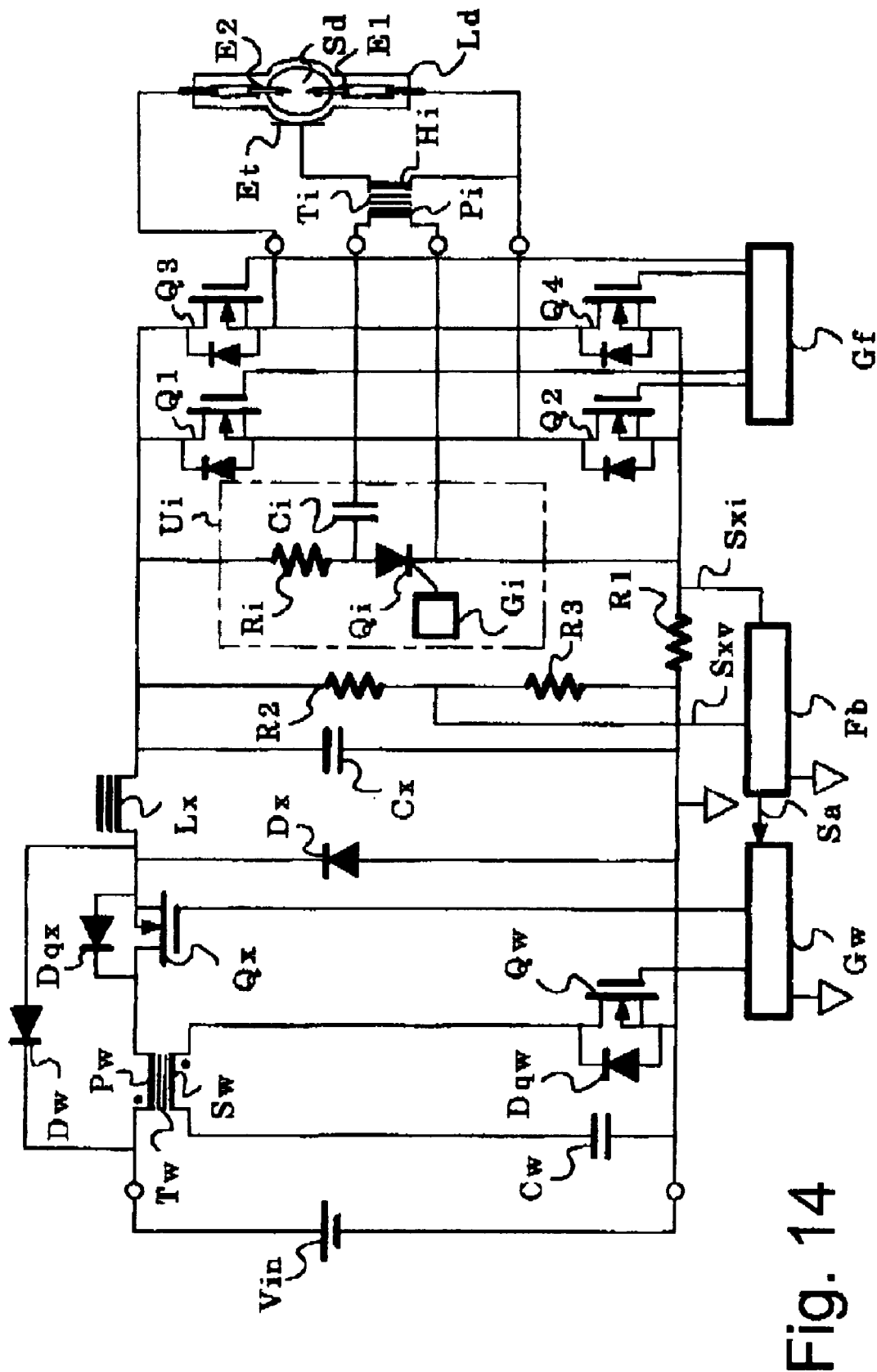
FIG. 14 shows a schematic of one embodiment of the device of the invention.

FIG. 14 shows an embodiment of the third aspect of the invention. Here, a device for operating a high pressure discharge lamp of the external trigger type is shown in which an AC voltage is applied to the high pressure discharge lamp (Ld).

It becomes possible to apply an alternating discharge voltage to the high pressure discharge lamp (Ld) by installing a full bridge inverter by adding switching devices to the DC output part of the DC-DC converter. The added switching devices are driven by a control circuit part (Gf) for full bridge driving and are controlled in such a way that the diagonal elements are driven in alternation so that the switching devices (Q1, Q4) (Q2, Q3) as the diagonal elements of the full bridge inverter are closed at the same time. A diode (Dw) is added to the circuit arrangement of the parts with resonant action shown in FIG. 14 compared to the arrangement shown in FIG. 6.

Figure 15:
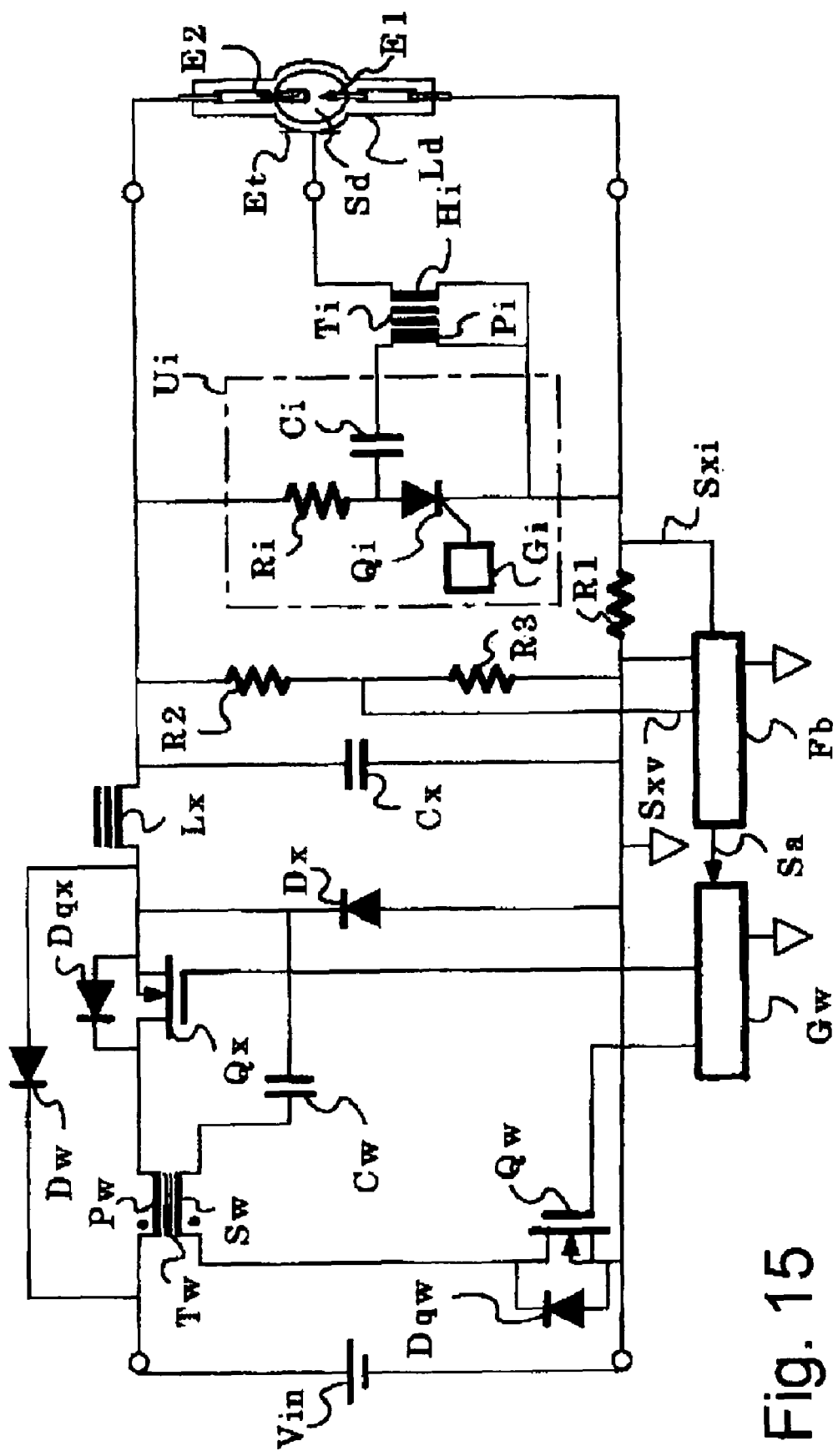
FIG. 15 shows a schematic of one embodiment of the device of the invention.

FIG. 15 shows another embodiment of the device as of the invention. Here, a device for operating a high pressure discharge lamp using a starter of the external trigger type and using the DC-DC converter described above using FIG. 4 is shown.

Figure 16:
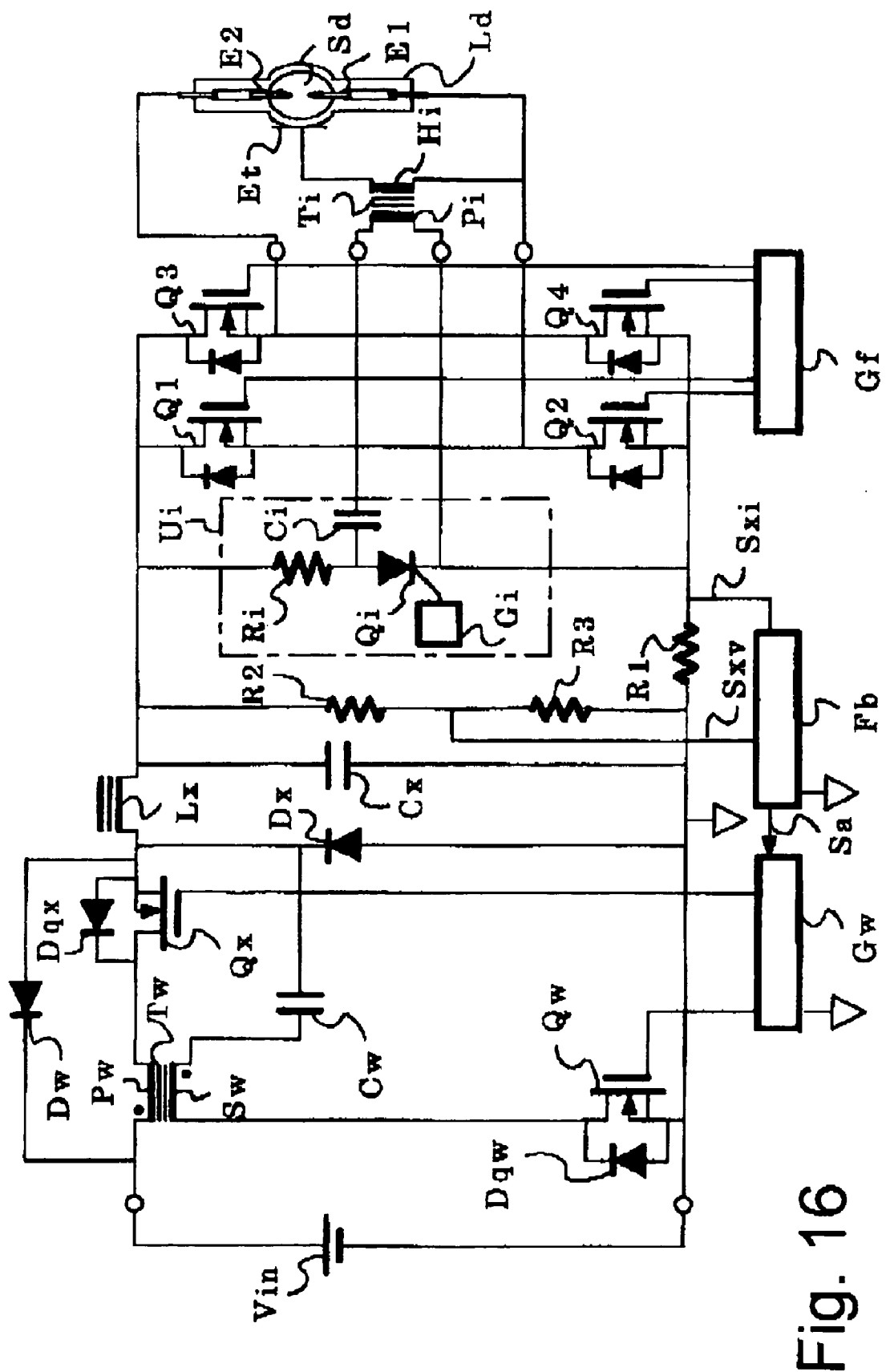
FIG. 16 shows a schematic of one embodiment of the device of the invention.

FIG. 16 shows another embodiment of the device as of the invention. Here, a device for operating a high pressure discharge lamp using a starter of the external trigger type which applies an AC voltage to the high pressure discharge lamp (Ld), and using the DC-DC converter described above using FIG. 4 is shown.

In the DC-DC converter as of the invention, zero voltage switching is accomplished in the transition of the auxiliary switching device (Qw) into the ON state. Therefore, the formation of noise is also kept fundamentally low during this switching. However, for the purpose of suppressing surge noise of the secondary circuit of the auxiliary transformer (Tw), a piece of coil can also be series connected to the secondary winding (Sw).

In these application documents, only what is most necessary in the circuit arrangement is described in order to explain the operation, function and action of the light source device as of the invention. It is assumed that the other details of circuit operation which is described in the embodiments, for example, the polarity of the signals, the specific choice, the specification addition and omission of circuit components or concepts such as changes and the like, are intensively carried out for reasons of facilitating the procurement of components and for economic reasons, in the practice of building an actual device.

It is assumed that especially a device for protecting the circuit components of a feed device, such as switching devices such as a FET or the like, against damage factors such as a wattage which exceeds a certain value, a current which exceeds a certain value, overheating and the like, or a device which reduces formation of radiation noise and line noise which arise according to operation of the circuit components of the feed device, or which prevents the noise which has formed from being released to the outside, such as for example a snubber circuit, a varistor, a clamping diode (including the "pulse-by-pulse method"), a current limiter circuit, a noise filter reactance coil with a "common mode" or a "normal mode", a noise filter capacitor and the like if necessary is added to the respective part of the circuit arrangements which are described in the embodiments.

ACTION OF THE INVENTION

The invention can provide a DC-DC converter by which the disadvantage of a conventional DC-DC converter, i.e. the disadvantage of difficult implementation of reducing the switching loss in a wide, variable range of the continuity ratio of the main switching device with low costs, is eliminated.

The invention can provide a device for operating a high pressure discharge lamp by which the disadvantage of a conventional device for operating a high pressure discharge lamp, i.e. the disadvantage of difficult implementation of reducing the switching loss with low costs, is eliminated.

What is claimed is:

1. A DC-DC converter of the voltage reduction-buck type comprising:
   a direct current source (Vin);
   an ON-OFF-controllable main switching device (Qx);
   a main coil (Lx) which is series connected to the main switching device (Qx);
   a fly-wheel diode (Dx) which is arranged such that the induction current of the main coil (Lx) flows when the main switching device (Qx) is shifted into the OFF state;
   a smoothing capacitor (Cx) for smoothing the output of the main coil (Lx); and
   an auxiliary transformer (Tw) with a primary winding (Pw) and a secondary winding (Sw),
   wherein the primary winding (Pw), the direct current source (Vin), the main switching device (Qx) and the fly-wheel diode (Dx) are connected in series, and the secondary winding (Sw), a resonant capacitor (Cw) and an ON-OFF-controllable auxiliary switching device (Qw) form a series-connected closed loop,
   wherein the main switching device (Qx) and the auxiliary switching device (Qw) are controlled such that they are alternatively shifted into the ON state, and
   wherein the main switching device (Qx) is shifted into the ON state within a given time after the auxiliary switching device (Qw) has been shifted into the OFF state.

2. The DC-DC converter as set forth in claim 1, wherein in the closed loop in which the secondary winding (Sw) of the auxiliary transformer (Tw), the auxiliary switching device (Qw) and the resonant capacitor (Cw) are series connected, one end of the auxiliary switching device (Qw) is connected to a ground line of the direct current source (Vin).

3. A DC-DC converter of the voltage reduction-buck type comprising:
   a direct current source (Vin);
   an ON-OFF-controllable main switching device (Qx);
   a main coil (Lx) which is series connected to the main switching device (Qx);
   a fly-wheel diode (Dx) which is arranged such that the induction current of the main coil (Lx) flows when the main switching device (Qx) is shifted into the OFF state;
   a smoothing capacitor (Cx) for smoothing the output of the main coil (Lx); and
   an auxiliary transformer (Tw) with a primary winding (Pw) and a secondary winding (Sw),
   wherein the primary winding (Pw), the direct current source (Vin), the main switching device (Qx) and the fly-wheel diode (Dx) are connected in series,
   wherein the secondary winding (Sw), a resonant capacitor (Cw) and an ON-OFF-controllable auxiliary switching device (Qw) are connected in series which is connected in series between a ground line of the direct current source (Vin) and a nodal point between the fly-wheel diode (Dx) and the main coil (Lx), and
   wherein the main switching device (Qx) and the auxiliary switching device (Qw) are controlled to alternately shift into the ON state and the main switching device (Qx) is shifted into the ON state within a given time after the auxiliary switching device (Qw) has been shifted into the OFF state.

4. A device for operating a high pressure discharge lamp (Ld) in which a discharge space (Sd) is filled with a discharge medium and a pair of opposed electrodes (E1, E2) for the main discharge are positioned within the discharge space, the device comprising a DC-DC converter of claim 1 for supplying the high pressure discharge lamp (Ld).

5. A device for operating a high pressure discharge lamp (Ld) in which a discharge space (Sd) is filled with a discharge medium and a pair of opposed electrodes (E1, E2) for the main discharge are positioned within the discharge space, the device comprising a DC-DC converter of claim 2 for supplying the high pressure discharge lamp (Ld).

6. A device for operating a high pressure discharge lamp (Ld) in which a discharge space (Sd) is filled with a discharge medium and a pair of opposed electrodes (E1, E2) for the main discharge are positioned within the discharge space, the device comprising a DC-DC converter of claim 3 for supplying the high pressure discharge lamp (Ld).

* * * * *